United States Patent
Irie et al.

(10) Patent No.: US 8,081,800 B2
(45) Date of Patent: Dec. 20, 2011

(54) DETECTION DEVICE OF VEHICLE INTERIOR CONDITION

(75) Inventors: Kota Irie, Hitachinaka (JP); Isao Furusawa, Hitachinaka (JP); Tatsuhiko Monji, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 952 days.

(21) Appl. No.: 11/655,151

(22) Filed: Jan. 19, 2007

(65) Prior Publication Data

US 2007/0176402 A1  Aug. 2, 2007

(30) Foreign Application Priority Data

Jan. 27, 2006  (JP) ................... 2006-018358

(51) Int. Cl.
*G06K 9/00* (2006.01)

(52) U.S. Cl. ................ 382/104; 382/100; 382/190

(58) Field of Classification Search ............. 382/104, 382/106, 100, 190
See application file for complete search history.

(56) References Cited

U.S. PATENT DOCUMENTS

| 6,442,465 | B2 * | 8/2002 | Breed et al. ............. 701/45 |
| 6,968,073 | B1 | 11/2005 | O'Boyle et al. |
| 2001/0035636 | A1 * | 11/2001 | Adachi ............. 280/735 |
| 2002/0181774 | A1 * | 12/2002 | Ishikura ............. 382/190 |
| 2004/0129478 | A1 * | 7/2004 | Breed et al. ............. 180/273 |

FOREIGN PATENT DOCUMENTS

| JP | 2004-069687 | 3/2004 |
| WO | WO 2005/032887 A2 | 4/2005 |

OTHER PUBLICATIONS

European Search Report dated May 22, 2007 (Eight (8) pages).

* cited by examiner

*Primary Examiner* — Hadi Akhavannik
(74) *Attorney, Agent, or Firm* — Crowell & Moring LLP

(57) ABSTRACT

A detection system of vehicle interior condition includes an illumination unit for illuminating a plurality of mutually different illumination regions including at least one seat of a vehicle and a surrounding region thereof so as to have different illumination time durations shifted by a predetermined time. An imaging unit photographs an occupant and/or an object on the seat upon each illumination of the illumination unit. A control processor compares a plurality of images photographed by the imaging unit, and generates information indicative of a condition of the occupant or object, based on the result of the comparison.

8 Claims, 22 Drawing Sheets

DETECTION DEVICE OF VEHICLE INTERIOR CONDITION

This application claims the priority of Japanese patent document 2006-018358, filed Jan. 27, 2006, the disclosure of which is expressly incorporated by reference herein.

BACKGROUND OF THE INVENTION

The present invention relates to a device or method for detecting a condition of interior of a vehicle.

Known as a related art technique for detecting the condition of a passenger, a driver, or an object in the interior of a vehicle, is, for example, a device which detects the presence or absence of a vehicle's occupant or the weight of the vehicle's occupant as a measurement device for determining the necessity or non-necessity of inflation of an airbag. The detection device includes a seat switch for informing of the presence of the vehicle's occupant when a load of a constant value or higher is applied to the surface of its seat, or a load sensor for measuring a weight applied to a seat.

Also known as a device for detecting a condition of a vehicle's occupant seat is a device which judges the condition of a used seat with use of a single imaging device and a plurality of spot light sources (for example, JP-A-2004-69687).

SUMMARY OF THE INVENTION

Accurate detection of the condition of interior of a vehicle is advantageous, for example, from the viewpoint of coping with the increased diversity of an airbag including a side airbag and a curtain airbag in these days. In order to effectively coping with the increased airbag diversity, however, this requires a technique for accurately measuring not only the presence or absence of a vehicle's occupant or the weight of the vehicle's occupant but also the attitude (or posture) or figure (body size) of the vehicle's occupant, or a technique for accurately detecting the condition of a used seat including the presence or absence of a mounted child seat and more desirably the condition of interior of a vehicle.

In the aforementioned prior art, however, it is necessary to stably and accurately detect the spot light. Meanwhile, when the device receives an external disturbance such as direct sunlight, it becomes difficult to detect the detection target accurately and stably. For example, in the environment of the vehicle interior when brightness abruptly changes or when sunlight enters the vehicle interior, it is difficult to detect a vehicle's occupant stably.

It is therefore an object of the present invention to provide a device which detects the condition of interior of a vehicle more accurately.

Information indicative of the condition of a vehicle's occupant or an object is generated by illuminating a vehicle's occupant or an object on a seat with a plurality of illumination regions illuminated for different illumination time durations shifted by a predetermined time, imaging or photographing the passenger or object on the seat upon each illumination, and then analyzing a plurality of the photographed images.

In accordance with the present invention, the condition of the vehicle interior can be detected more accurately.

Other objects, features and advantages of the invention will become apparent from the following description of the embodiments of the invention taken in conjunction with the accompanying drawings.

DESCRIPTION OF THE EMBODIMENTS

The present invention will be explained in connection with an embodiment.

Figure 29:
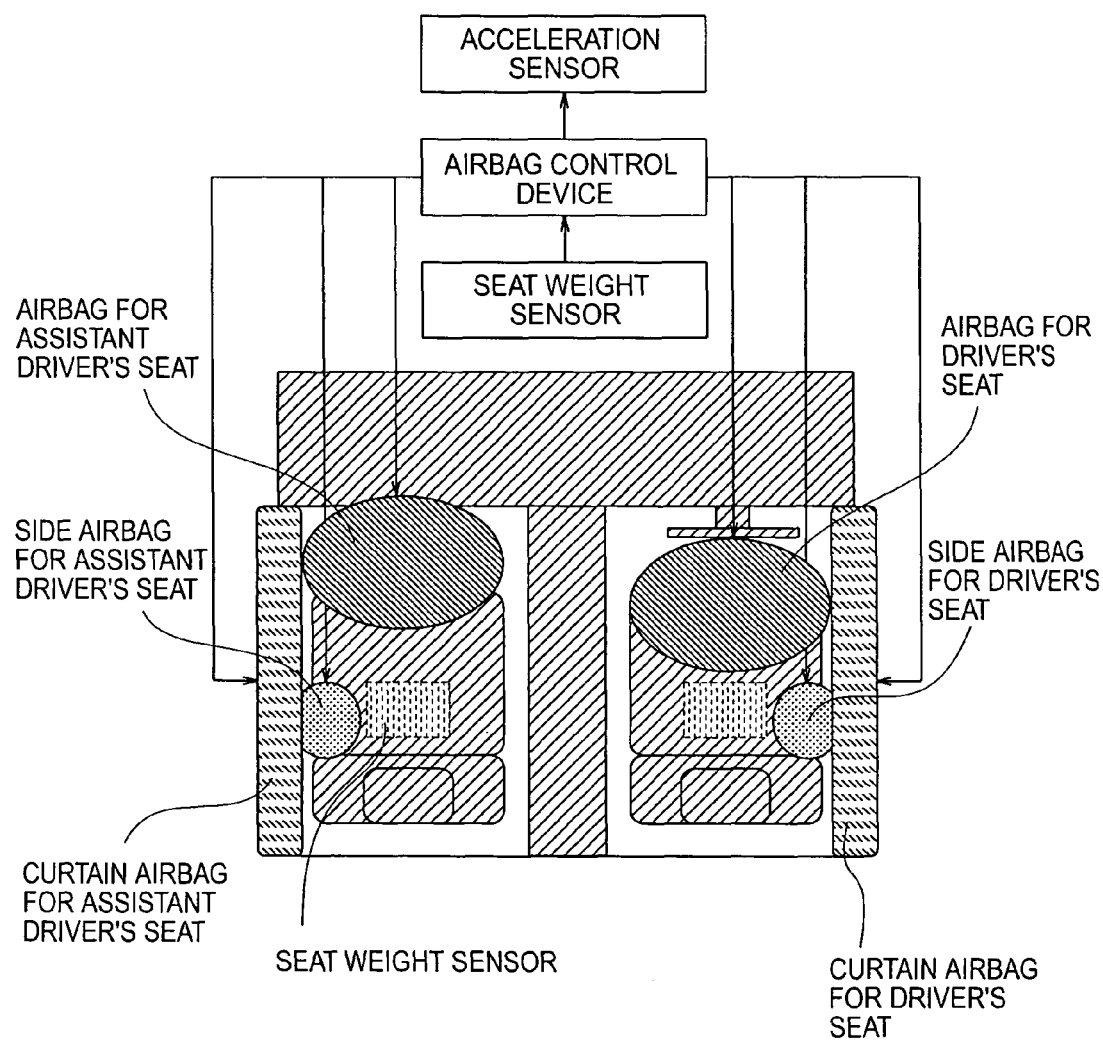
FIG. 29 shows an example of an occupant detection system using a seat weight sensor.

The present embodiment is directed to a detection device of vehicle interior condition for -recognizing the use condition of a seat such as the presence or absence of a vehicle's occupant, occupant's attitude, occupant's figure, or a child seat, and also to a detection method of vehicle interior condition. For example, as a measurement device for controlling the presence or absence of inflation of an airbag, a device for detecting the presence or absence of a vehicle's occupant or occupant' weight is considered. Such a detection device includes a seat switch for informing of the presence of the occupant when a load of a constant value or higher is applied to the surface of the seat, or a load sensor for measuring a weight applied to the seat. For example, a seat sensor mounted to the seat for detecting a weight is enumerated as the detection device. The sensor is used to control the inflation of an airbag depending on the presence or absence of a vehicle's occupant or occupant's weight. FIG. 29 shows an example of an occupant detection system using a seat weight sensor.

Figure 30:
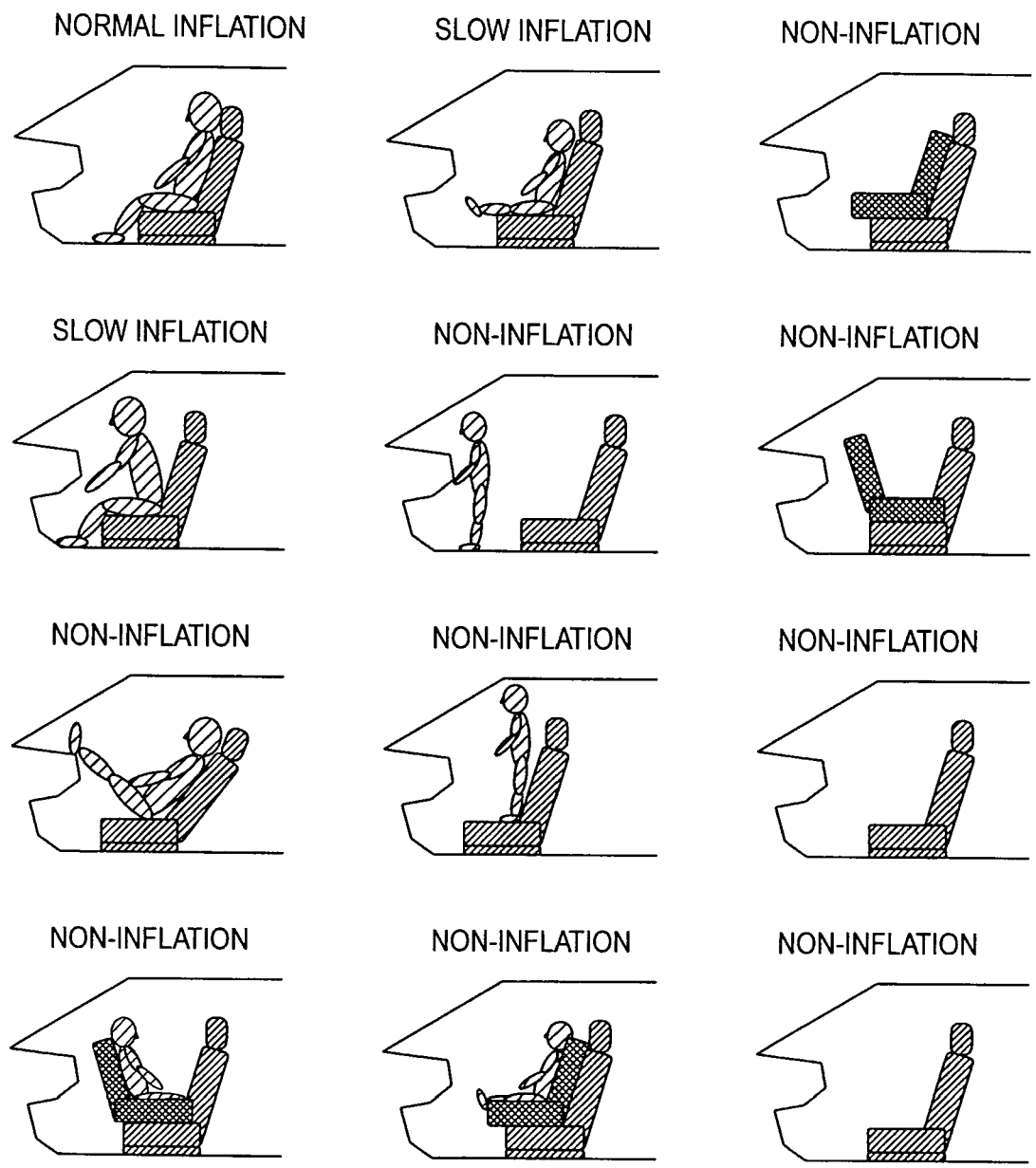
FIG. 30 shows vehicle seat conditions and how to inflate an airbag.

Such a occupant detection system can determine the presence or absence of a vehicle's occupant or occupant's weight, but it is difficult for the system to determine an occupant's attitude or figure, or a child seat. More specifically, when the occupant is present close to an airbag device or when a child seat is present in an assistant driver's seat, it is impossible to suitably control the inflation of the airbag. FIG. 30 shows various conditions of a vehicle seat and how to inflate an airbag.

In order to cope with the diversity of the airbag including a side airbag and a curtain airbag, it is necessary to control the inflation of the airbag more accurately. To this end, a technique for accurately measuring not only the presence or absence of a vehicle's occupant or occupant's weight but also occupant's attitude or figure, or a technique for detecting the used condition of a seat such as a mounted child seat, is required.

When it is unnecessary to inflate its seat airbag as in the absence of a vehicle's occupant in the seat, the airbag can be prevented from being inflated, thus contributing to reduction in user's maintenance cost or to resource saving.

In the present embodiment, there is provided a detection device of vehicle interior condition which accurately detects the condition of interior of a vehicle, and which accurately detects the presence or absence of a vehicle's occupant, occupant's attitude and figure, and the use condition of a seat such as a child seat, while avoiding the influence caused by variations in the brightness of the vehicle interior.

In the present embodiment, an imaging unit includes, for example, an illumination unit having a plurality of illumination devices for illuminating predetermined ranges of light on predetermined regions of in predetermined regions in the vehicle interior including vehicle's seats, an imaging unit having at least one imaging device for passing a predetermined wavelength range of light therethrough to photograph a predetermined region in the vehicle interior, and an image processing unit for processing an image photographed by these units to detect the used condition of a vehicle's seat.

The above illumination is implemented preferably by a plurality of illumination devices. The illumination devices have directivities respectively in predetermined directions, and the light emissions of the illumination devices are sequentially turned ON and OFF in synchronism with the shutter of the imaging device.

With the above arrangement, the presence or absence of an object present in a vehicle's seat as well as the position of the object can be identified.

Further, it is preferable to illuminate a vehicle's occupant in a predetermined directions from left or right of the occupant or in both direction from the left and right. Under this condition, even when the occupant sits on the seat with his or her head part shifted in a left or right direction, the occupant can be reliably illuminated.

When a searching range of stereo matching is limited on the basis of positional information obtained by the illumination, the quantity of calculating operation can be reduced and thus a processing speed can be made high.

Further, the positional information obtained by the illumination can be used as a correction value for a distance-measured result by the stereo camera to thereby increase an accuracy.

It is preferable that the imaging device and the illumination devices be mounted in an upper part of an instrumental panel. As a result, even when a large luggage is present in front of a vehicle's seat or even when a luggage is present on the instrumental panel, the vehicle's seat can be photographed. Further, even when the vehicle's occupant spreads out a newspaper and so on, the occupant can advantageously be detected by photographing the occupant from the upper side.

When it is desired to preferably detect the condition of a driver's seat, the imaging device photographs the driver's seat condition from an A pillar at the side of the driver's seat or from a sun visor part. When it is desired to detect the condition of an assistant driver's seat, the imaging device is mounted so as to photograph the condition from an A pillar at the side of the assistant driver's seat or from the sun visor part. Since a vehicle's window can be avoided from entering the photographing region in this manner, the influence of an external disturbance such as a background scene outside of the vehicle or sunlight on the imaging device can be minimized. In addition, since a region enough to install the imaging device can be easily secured in the A pillar or in the sun visor part, undesirable vehicle design degradation can be minimized.

The imaging unit is preferably a monocular camera as a combination of a single imaging device and a lens, or a stereo camera made up of at least two monocular cameras. Meanwhile, the illumination device employs a predetermined wavelength range of near-infrared ray. The illumination device may also be used in combination with a filter which is provided in front of the imaging device to pass a wavelength range of infrared ray therethrough. Thus only reflected light of light illuminated by the illumination device is received by the imaging device, the influence of sunlight incident from outside of the vehicle or light such as light from outdoor lamps or light from a headlight of an oncoming vehicle upon the imaging device can be minimized.

When a monocular camera is used as the imaging unit, a unit for recognizing the use condition of a seat recognizes the seat's use condition on the basis of a shading distribution in images illuminated at different locations by a plurality of illumination devices and the quantities of features in the images including a two-dimensional shape. When a stereo camera is used as the imaging unit, the recognition unit generates a range image from left and right images and recognizes the seat's use condition on the basis of a 3-dimensional shape feature obtained from the generated range image.

The absence of a vehicle's occupant, the presence of a vehicle's occupant, and the presence of a child seat are determined. The presence of a vehicle's occupant can be determined by judging the occupant's figure and the occupant's attitude and by pattern-collating them with previously-registered learning data. With such an arrangement, the presence or absence of the occupant, occupant's figure and attitude, and the presence of a child seat can be accurately detected respectively. Further, a distance from a target object can be detected from the range image. Thus even when the seat is shifted in a forward or backward direction, the aforementioned determination can be achieved.

Preferably, when occupant's figure fails to reach a predetermined figure level, when a child seat is present, when the occupant is present more closer to an airbag, when the occupant sits on the seat in an incorrect attitude, when an occupant is absent, and when a luggage other than the occupant is placed on the vehicle's seat; the airbag fails to be inflated. When the occupant's figure is not lower than the predetermined figure level and also lower than a newly-provided predetermined figure level (e.g., about 10 years old), the inflating intensity of the airbag is weakened. In seat use situations other than the aforementioned situations, the airbag is normally inflated. Through such control of the airbag inflation as mentioned above, occupant's safety against the airbag inflation can be secured. Further, when the airbag inflation is unnecessary as when no occupant is present in the seat, the inflation of the airbag can be avoided. This can lead to reduction in user's maintenance cost and even to resource saving.

When the vehicle runs at a speed not higher than a predetermined speed, it is preferable to change the processing period of the occupant detection according to the vehicle speed, for example, to delay the occupant detecting period. Further, the occupant detecting period may be changed between when the occupant is present close to the airbag and when the occupant is present sufficiently away therefrom. As a result, when it is required to keep higher the occupant safety against the airbag inflation, the detection device of vehicle interior condition can have a sufficient detection capability and can inflate the airbag safely. In the normal case, the detection device of vehicle interior condition can minimize its power consumption, thus contributing to reduction of a load to a battery or a generator and also to maintenance of its durability.

One or more features of the invention mentioned above may be selected depending on desired technical to be obtained effects.

Explanation will be made as to a specific embodiment.

Embodiment 1

Figure 1:
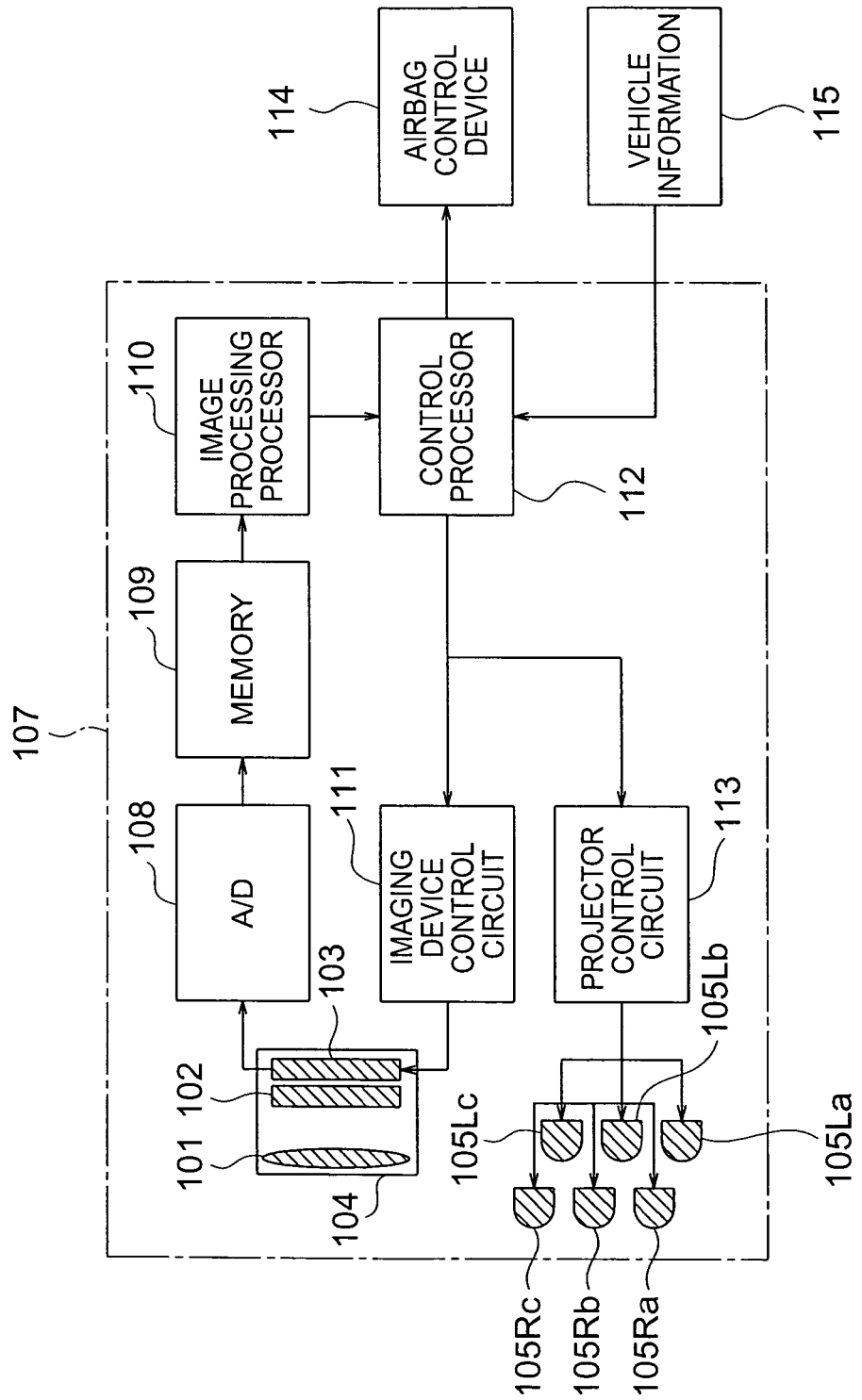
FIG. 1 shows an arrangement of a detection system of vehicle interior condition in accordance with an embodiment of the present invention.

FIG. 1 shows an arrangement of a detection system of vehicle interior condition in accordance with an embodiment of the present invention.

The system is directed to detecting occupant's head part position, an occupant's attitude, an occupant's figure, a child seat, a luggage, and so on in a vehicle. For example, the system is used to control the inflation of the airbag. In FIG. 1, an arrowed solid line indicates the flow direction of an electric signal.

A detection system of vehicle interior condition 107 in accordance with the present embodiment includes an imaging device 103 capable of photographing predetermined regions within a vehicle and sensitive to at least an infrared ray wavelength range, an infrared ray illumination unit 105 for illuminating the regions to be photographed by the imaging device 103, an illumination unit control circuit 113 for controlling the illumination unit 105, an imaging device control circuit 111 for controlling the shutter of the imaging device 103, an analog-digital converter 108 for converting a digital signal from the imaging device to an analog signal, a memory 109 for storing an acquired image therein, an image processing processor 110 for processing the acquired image to generate a range image, and a control processor 112 for detecting an vehicle's occupant from the image and issuing an airbag inflation control command taking information from the vehicle into consideration.

The devices and constituent elements shown in FIG. 1 may be arbitrarily separated and arranged. For example, the circuits, processors, etc. other than the illumination unit 105 and the imaging unit 104 may be accommodated in a single casing as a control device (detection device of vehicle interior condition), and signal lines, and so on may be wired between the illumination unit 105 and the imaging unit 104.

Figure 2:
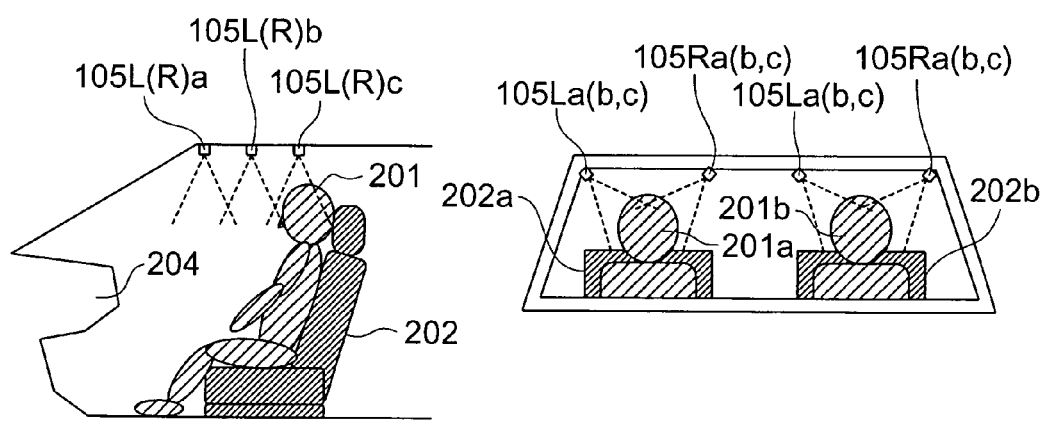
FIG. 2 is a diagram for explaining a deployment of illuminators 105 in FIG. 1.
Figure 3:
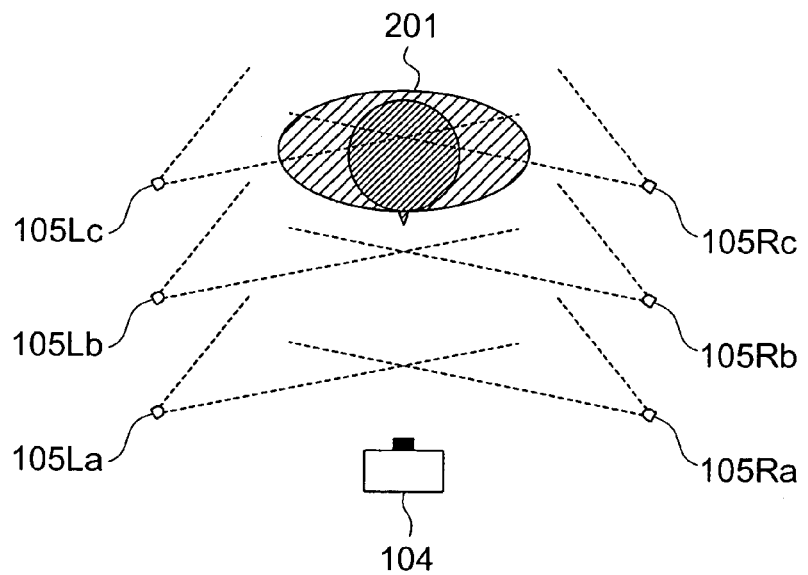
FIG. 3 is a diagram for explaining a deployment of the illuminators 105 in FIG. 1.

FIGS. 2 and 3 show an deployment of the illumination unit 105 in FIG. 1.

In the illustrated example, the illumination unit 105 is made up of 6 infrared ray LEDs of 105La, 105Lb, 105Lc, 105Ra, 105Rb, and 105Rc. The respective illumination devices are mounted at constant angles and illuminate different regions. And the illumination devices illuminate the regions ranging from the headrest to the vicinities of the seat back and the airbag to be photographed by the imaging device, and the light emission of the illumination devices is sequentially turned ON and OFF in the timing synchronized with the shutter of the imaging device 103. As the infrared ray LEDs, devices for emitting a near-infrared ray in a wavelength range of 800 nm-900 nm are employed. As shown in FIG. 2, more specifically, the infrared ray LEDs are arranged on the ceiling of the vehicle above a driver's seat 202a and/or an assistant driver's seat 202b along the both sides of the ceiling in rows in a vehicle proceeding direction. The illumination angles of the infrared ray LEDs are adjusted so that the LEDs illuminate vehicle's occupants 201a and 201b, the driver's seat 202a, and the assistant driver's seat 202b. Although the illumination unit 105 has been arranged at the driver's seat and at the assistant driver's seat in this example, the illumination unit 105 may be provided only at the driver's seat or only at the assistant driver's seat depending on a vehicle to be used.

Figure 4:
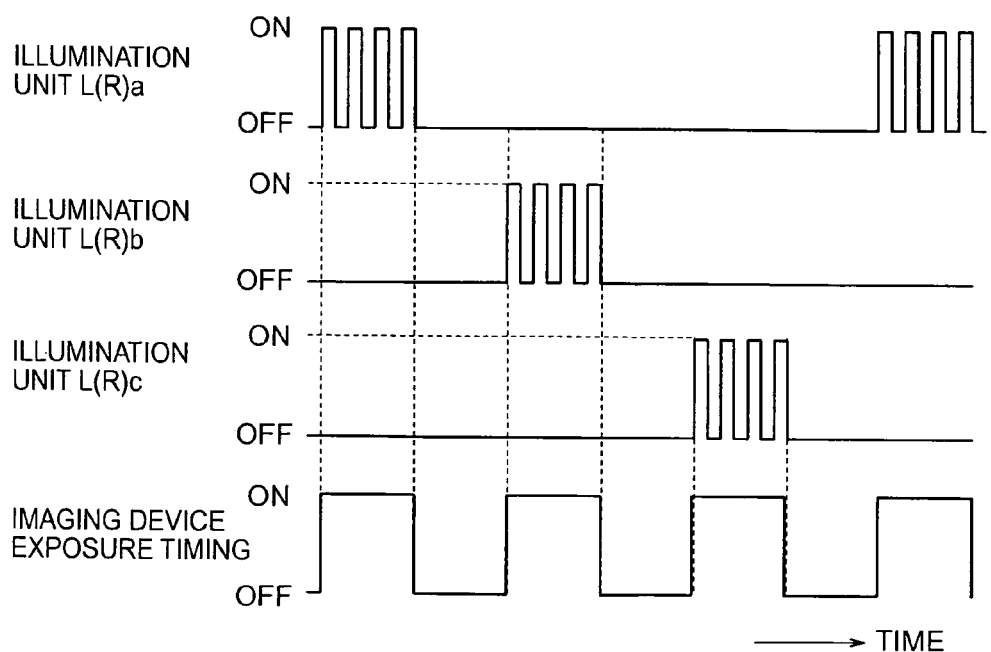
FIG. 4 is a timing chart showing light emission timing of illumination units 105 and exposure timing of an imaging device 103 in FIG. 1.

FIG. 4 is a timing chart showing the light emission timing of the illumination unit (illumination devices) 105 and the exposure timing of the imaging device 103 in FIG. 1. The LEDs emit light in a pulsative manner taking a high output and a high durability into consideration. First, simultaneously with the start of pulsative light emission of the illumination device 105L(R)a, the shutter of the imaging device 103 is opened to start light exposure. After the exposure for a predetermined time, the light emission of the illumination device 105L(R)a is stopped to close the shutter of the imaging device. Subsequently, similar operations are sequentially carried out even for the illumination device 105L(R)b and the illumination device 105L(R)c.

As shown in FIG. 1, the imaging unit 104 is made up of a lens 101 for condensing reflected light from a photographing region, a band pass filter 102 for passing infrared light having predetermined wavelengths therethrough, and an imaging device 103 for converting the reflected light from the photographing region into an electric signal.

As the imaging device 103, a CCD element sensitive to the wavelength range of the infrared ray LED is used. The band pass filter 102 for passing only the wavelength range of the infrared ray LED therethrough is provided between the CCD element and the lens.

Figure 5:
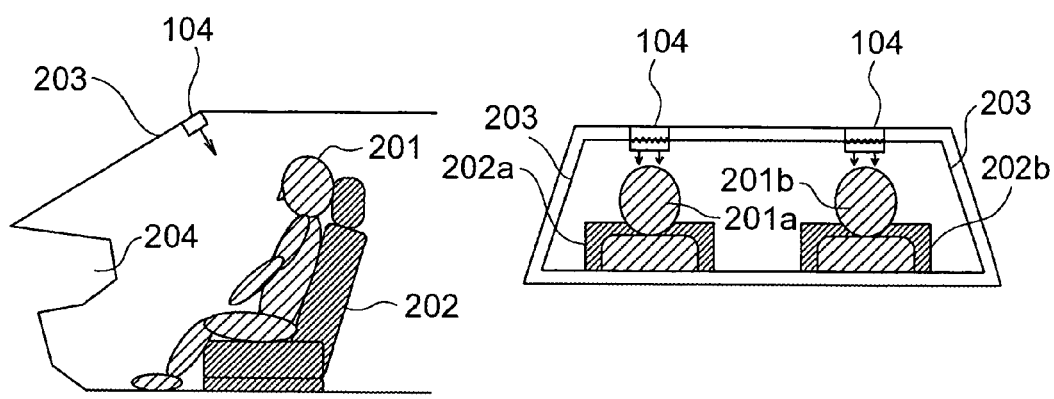
FIG. 5 shows a deployment of imaging units 104 in FIG. 1.

FIG. 5 shows a deployment of the imaging units 104 in FIG. 1.

The imaging unit 104 are mounted on the vehicle ceiling at upper forward sides of the driver's seat 202a and the assistant driver's seat 202b so as to photograph any one of the vicinities of at least the headrest, seat back or airbag of the driver's seat 202a and assistant driver's seat 202b.

In FIGS. 1 and 5, the imaging units 104 and the illumination unit 105 are mounted at a level higher than an instrumental panel 204. It is preferable that glass members including a windshield, side windows, rear side windows, a rear window, so on in the vehicle be made of a material which has such a characteristic as to block transmission of most infrared light.

The control processor 112 in FIG. 1 has at least one of a transmitter for transmitting a control signal to the imaging unit 104 and the illumination unit 105, an image comparator for comparing a plurality of images photographed by the imaging unit 104, a determiner for determining the condition of the vehicle's seat on the basis of a result processed by the image processing processor 110, an information generator for generating information indicative of the condition of the vehicle's occupant and/or an object on the basis of a comparison result of the image comparator, a receiver for receiving vehicle information 115 about vehicle speed, the mount condition of a seat belt, etc., and an airbag transmitter for transmitting an airbag inflation method to an airbag control device 114 on the basis of the information generated by the information generator.

The airbag inflation method is determined by synthetically judging the condition of the vehicle's seat obtained from the result processed by the image processing processor 110, velocity information from the vehicle, and a buckle switch of the seat belt. On the basis of the judged result, the control processor 112 determines the presence or absence of the airbag inflation and the intensity of inflation, and transmits a signal to the airbag control device 114.

The airbag control device 114, on the basis of the signal received from the control processor 112, controls the presence or absence of the airbag inflation and the quantity of airbag inflation. More specifically, the airbag control device controls the airbag inflation to any of non-inflation, soft inflation, and strong inflation.

Explanation will next be made as to the operations of the respective constituent elements of the detection device of vehicle interior condition in the present embodiment.

Infrared light is applied from the illumination unit 105 to the photographing regions. The application of infrared light from the illumination unit is always carried out regardless of its ambient brightness.

Figure 8:
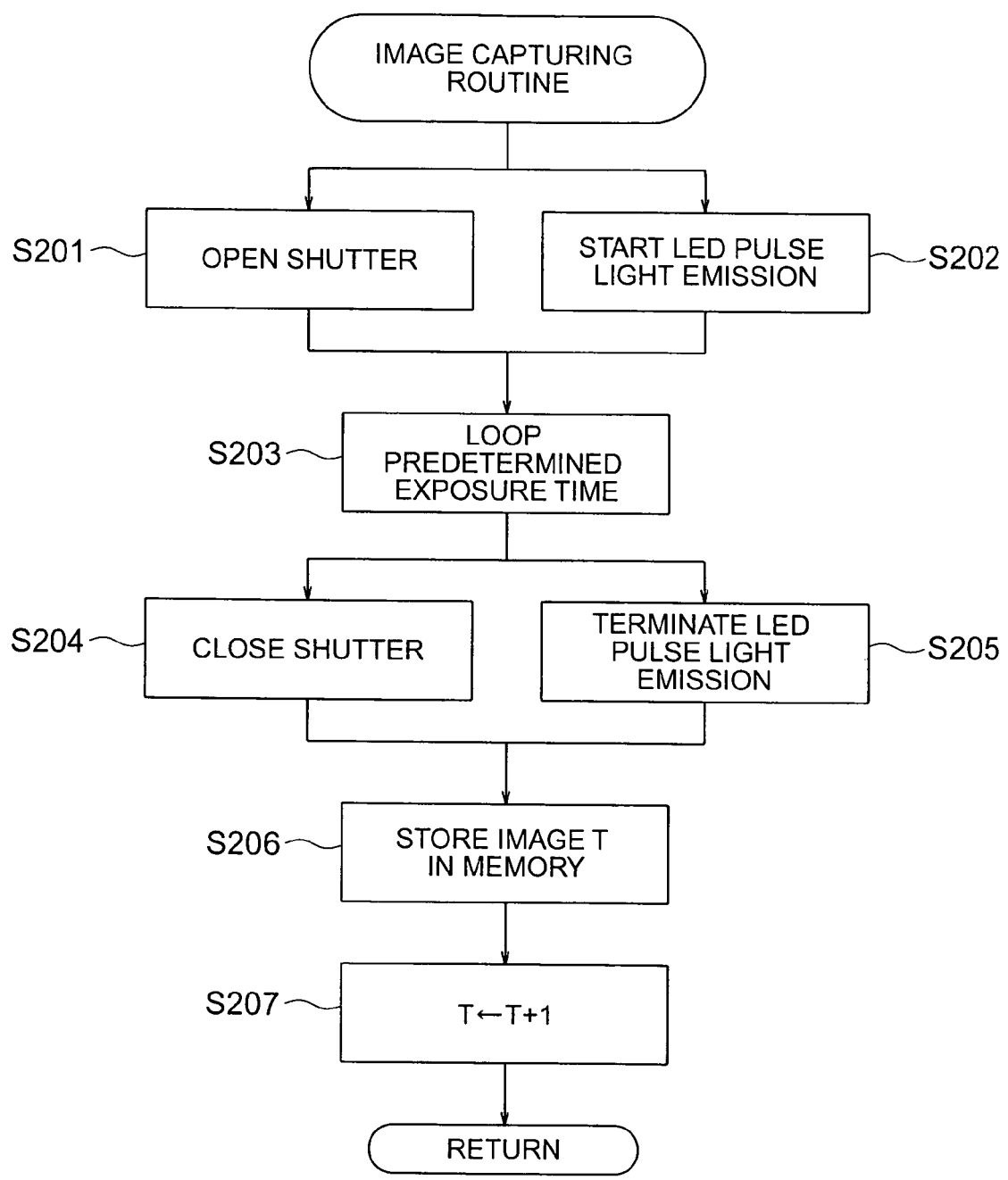
FIG. 8 is a flow chart showing part of the flow chart for detection of the vehicle interior condition in the embodiment of FIG. 1.

As shown in FIG. 4, the LED light emission ting and the exposure timing of the imaging unit 104 are synchronously carried out (steps S201 to S205 in FIG. 8 to be explained later).

Figure 6:
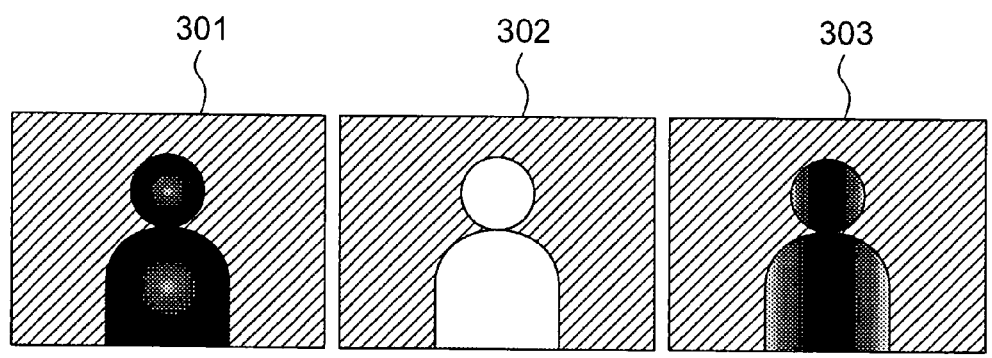
FIG. 6 shows images acquired in the embodiment of FIG. 1.

FIG. 6 shows images obtained in the embodiment of FIG. 1.

More specifically, an image 301 when the illumination device 105L(R)a illuminates, an image 302 when the illumination device 105L(R)b illuminates, an image 303 when the illumination device 105L(R)c illuminates are acquired. The control is sequentially repeated.

Reflected light in the respective illumination regions of the illumination devices 105L(R)a to 105L(R)c are acquired as the 3 images 301 to 303 shown in FIG. 6, and then stored in the memory 109. The stored images are subjected to template matching by the image processing processor 110, and ones of the 3 images having the occupants are selected by the control processor 112 (in which the template matching will be detailed later). From the above operation, the presence of the occupants in the selected images in the LED illumination regions is recognized, and their seat positions in forward and backward directions are identified.

The illumination devices 105L(R)a to 105L(R)c illuminate the occupant from a left or right direction. Thus, even when the occupant sits the seat with her or his head part shifted in a left or right direction, the occupant can be reliably illuminated.

Window members including a windshield, side windows, rear side windows, and a rear window in the vehicle are made of preferably a material having such a characteristic as to have substantially no transmission of infrared light therethrough. As a result, such windows can block most infrared light in sunlight incident from outside of the vehicle or in light from a headlight of the vehicle.

In other words, most external disturbance as light entering the vehicle does not enter the vehicle interior, only reflected light of infrared light emitted from the illumination unit 105 is passed through the band pass filter 102 provided in the imaging unit 104, and imaged by the imaging unit 104. As a result, photographing under a constant illumination condition can be achieved regardless of the ambient brightness.

With such an arrangement as mentioned above, the position of an object present in vehicle's seat can be identified by detecting the quantity of light from each illumination unit 105 through image processing.

Further, when the occupant is illuminated in a predetermined direction from left or right of the occupant or in both directions of the left and right, the occupant can be reliably illuminated even when the occupant sits in the seat with her or his head part shifted in a left or right direction. Thus, the occupant can stably be photographed regardless of the occupant's attitude.

The imaging units 104 and the illumination unit 105 are mounted at a level higher than the instrumental panel 204. For this reason, even when a large luggage is present in the front side of the vehicle's seat or even when a luggage is present on the instrumental panel, the vehicle's seat can be photographed. Further, even when the occupant spreads out a newspaper, the occupant can be detected by photographing the occupant from her or his upper side.

In addition, the lens is set to have a small focal length f in order to spread a photographing range. Accordingly, even when a distance between the imaging unit 104 and the occupant 201 as a measurement target is short, a part of the occupant ranging from his head part to the upper half part can be reliably photographed.

Explanation will then be made as to a recognition method relating to the occupant detection.

FIGS. 7 to 11 show flow charts of the vehicle interior condition detection in the embodiment of FIG. 1.

Figure 7:
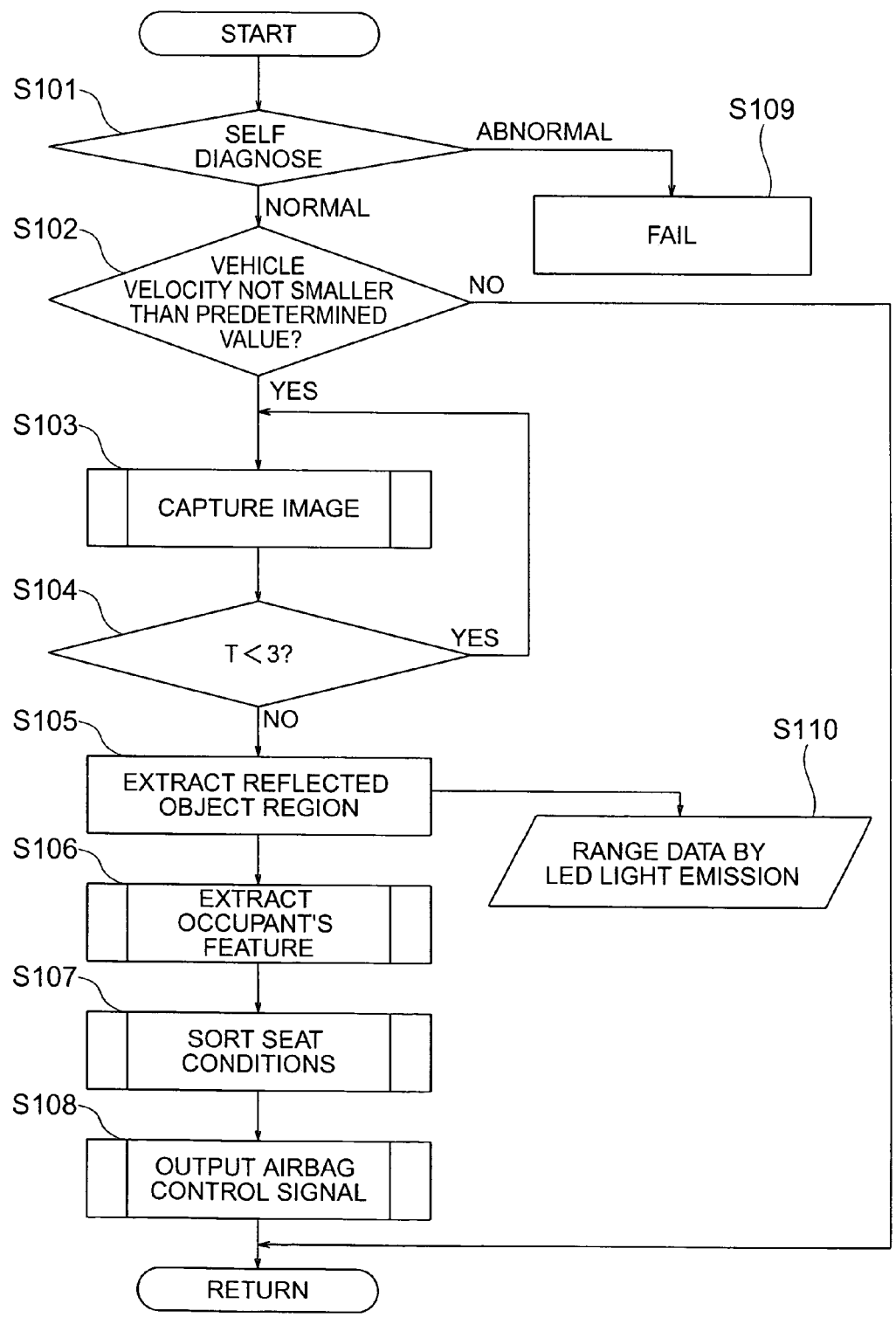
FIG. 7 is a flow chart for detection of a vehicle interior condition in the embodiment of FIG. 1.

At a step S101 in FIG. 7, first of all, the detection device of vehicle interior condition performs self diagnosing operation to check for the normal operation of the detection device of vehicle interior condition. When the system determines the abnormality, the system transmits a fail signal to the vehicle at step 109. When the system determines the normality, the system proceeds to the next step.

At a step S102, the system determines whether or not vehicle velocity is not lower than a predetermined value. When determining that vehicle's velocity is lower than the predetermined value, the system goes to a 'return' step without executing the subsequent steps. When the vehicle velocity is not lower than the predetermined value, the system proceeds to a step S103 to execute a subroutine for image capture. Steps S103 to S104 are repeated by a number of times corresponding to the number of such illumination devices 105.

Explanation will be made as to how to capture an image in the step S104, by referring to FIG. 8.

At a step S201, the shutter is opened, and the pulse light emission of the LED in the illumination device is started at a step S202. At a step S203, the system enters into a loop for a predetermined exposure time. The system closes the shutter at a next step S204, and terminates the pulse light emission of the LED at a step S205. A result of such a series of operations is shown by the timing chart in FIG. 4 explained previously. Thereafter, at a step S206, a photographed image is stored in the memory. At a step S207, T as the ID of the image is incremented.

At a next step S105, the position of the occupant is calculated based on the quantity of reflected light and/or a shading distribution caused by the illumination unit 105. At a step S110, range data is stored in the memory. For example, when the quantity of reflected light by the illumination device 105L (R)b is larger than those of the other illumination devices 105, the system determines that an object is present in a region to be illuminated by the illumination device 105L(R)b.

At a next step S106, the system determines whether or not the present object is an occupant and also extracts a feature when the object is an occupant. Details thereof will be explained in FIG. 9. At a step Image 301, the system reads out the image from the memory. At a step S302, the system reads out the range data based on the LED light emission (step S308) and normalizes a head part template size. At a step S303, when the present object is a human, the system subjects a feature of the human head part shape to template matching, utilizing the person who has a head part. Since the shape of the head part can be regarded as a substantially sphere, the head shape has less variation caused by different attitudes.

When a correlation value not smaller than a predetermined threshold is obtained in the template matching, the system determines the presence of an occupant (step S304). Generally speaking, when a template is different in size from a model in shape-based template matching, a matching accuracy drops. Thus, in order to increase the matching accuracy, normalization of the template size is previously carried out using a distance between the imaging unit 104 and the occupant obtained by illumination unit 105 (step S302).

Figure 9:
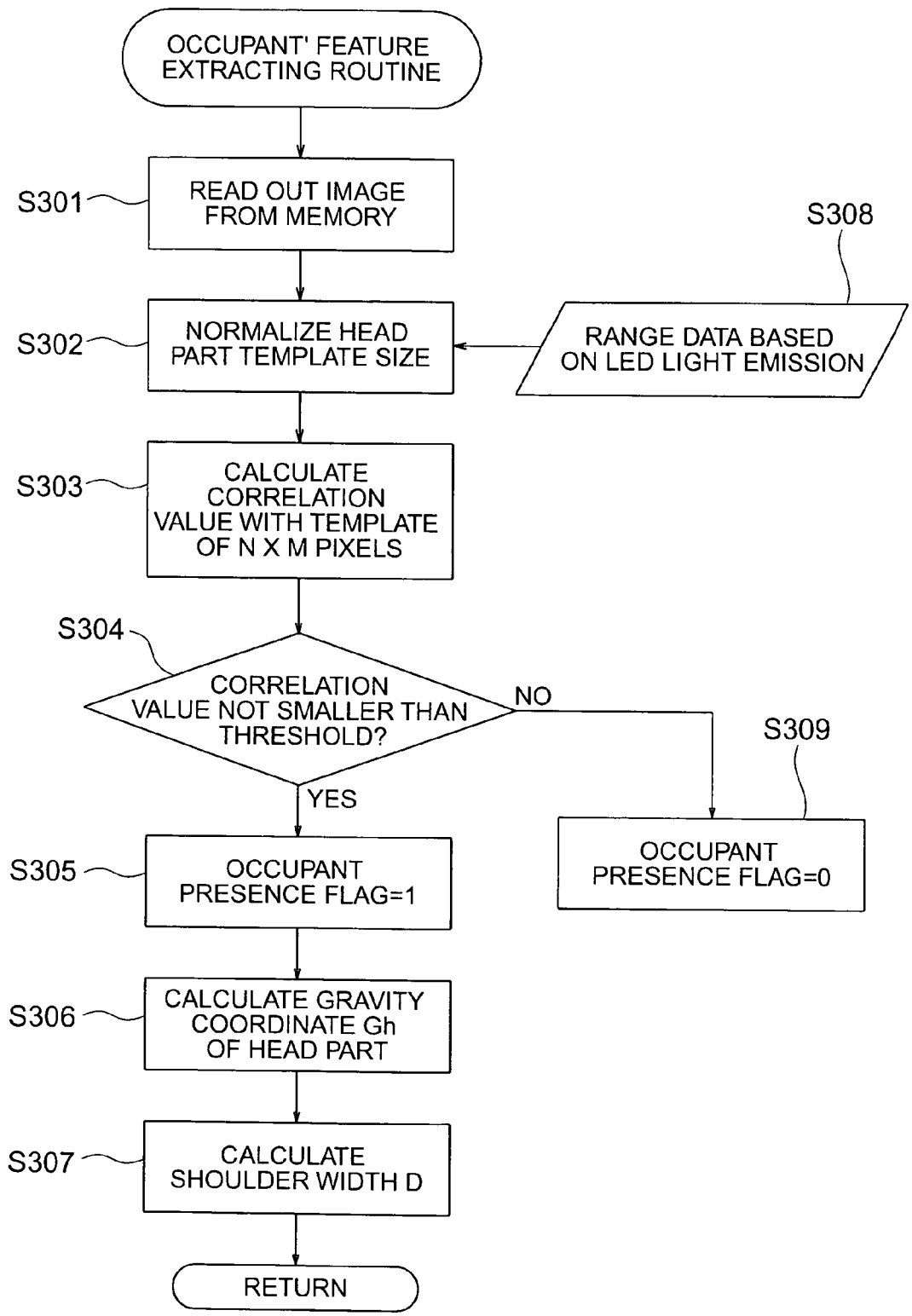
FIG. 9 is a flow chart showing part of the flow chart for detection of the vehicle interior condition in the embodiment of FIG. 1.
Figure 12:
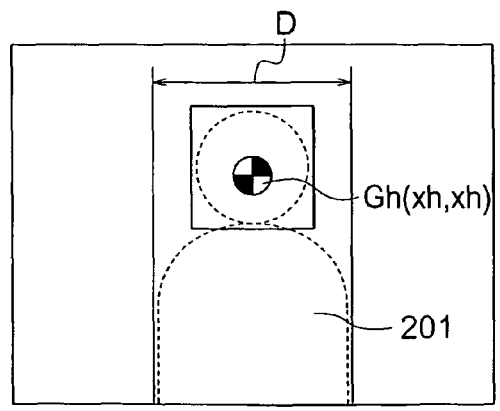
FIG. 12 shows how to find a gravity coordinate in template matching in FIG. 9.

FIG. 12 shows how to calculate a gravity coordinate in the template matching of FIG. 9.

When the head part is detected by the template matching, the system determines the presence of the occupant 201 (step S305), and calculates a gravity coordinate Gh (xh, yh) of the head part (step S306). The system determines the attitude and/or height of the occupant 201 based on the gravity coordinate Gh. The system also calculates a shoulder width D as a figure index (step S307). The system extracts the end edges of left and right shoulders, and the shoulder width D is defined as a distance between the extracted end edges. The extraction of the shoulder width D can be easily estimated from a shoulder area when the position of the head part is already known, and thus high speed processing can be attained.

Figure 10:
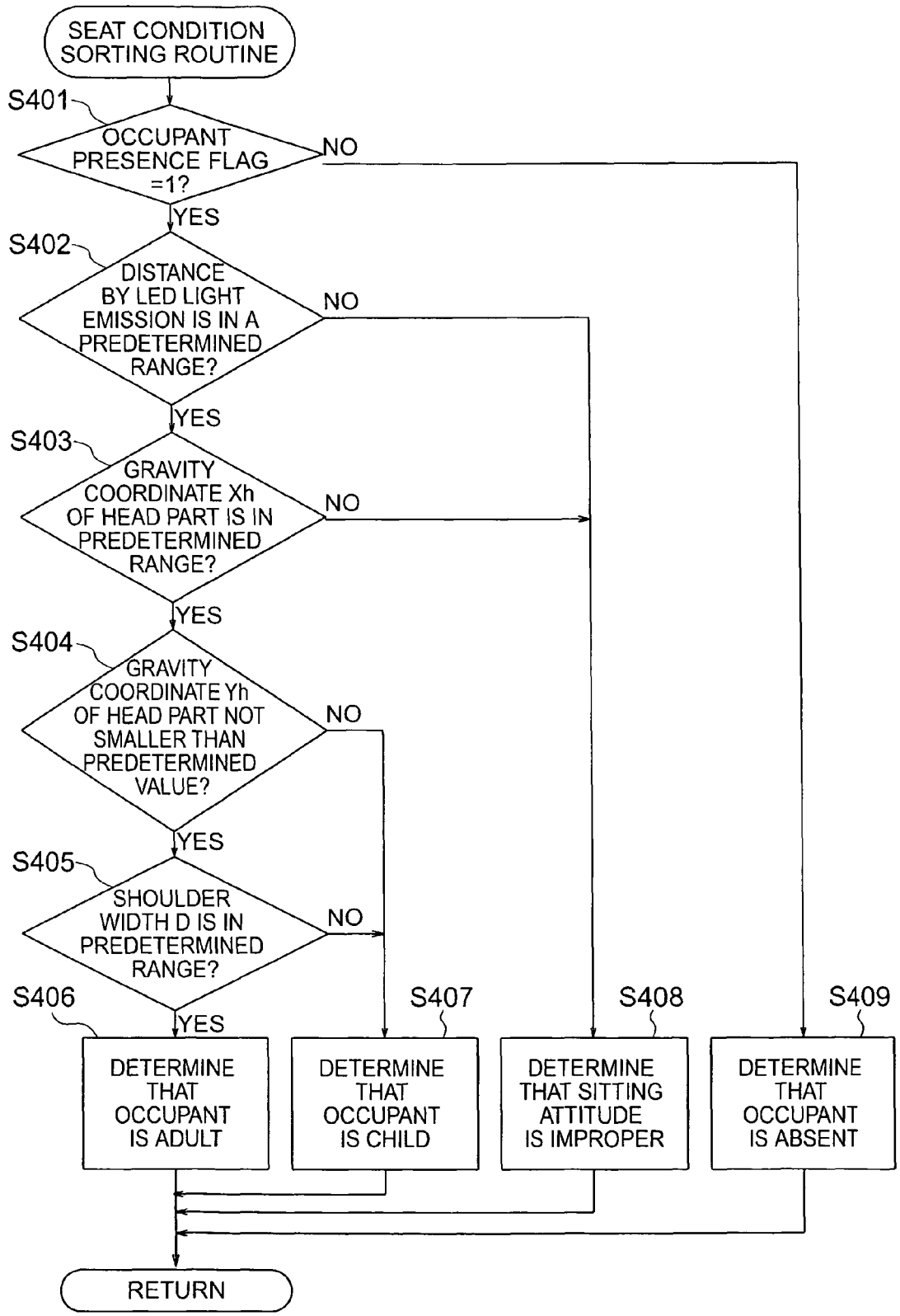
FIG. 10 is a flow chart showing part of the flow chart for detection of the vehicle interior condition in the embodiment of FIG. 1.

Thereafter, at a step S107 in FIG. 7, the system executes such a sorting routine of the seat condition as shown in FIG. 10. An occupant presence flag is first determined (step S401). When the flag has a value of 1, the system proceeds to a step S402. When the flag has a value other than 1, the system determined the absence of the occupant (step S409). Subsequently, on the basis of the range data obtained in the step S11 in FIG. 7, the system determines whether or not the occupant is present in a predetermined region in forward and backward directions (step S402). When determining the absence of the occupant in the predetermined region, the system determines that the seat attitude is incorrect (step S408). Subsequently, when a gravity coordinate xh for the head part in a horizontal direction is in a predetermined threshold range with use of a result of the step S106 in FIG. 7, the system determines that the seat attitude is proper (step S403). When the gravity coordinate departs from the predetermined threshold range, the system determines that the seat attitude is improper (step S408). A head part gravity coordinate yh in a vertical direction and the shoulder width D are not smaller than predetermined thresholds respectively, the system determines that the occupant is an adult (steps S404, S405, and S406). When the gravity coordinate yh and the shoulder width D are smaller than the predetermined thresholds, the system determines that the occupant is a child (step S407).

Figure 11:
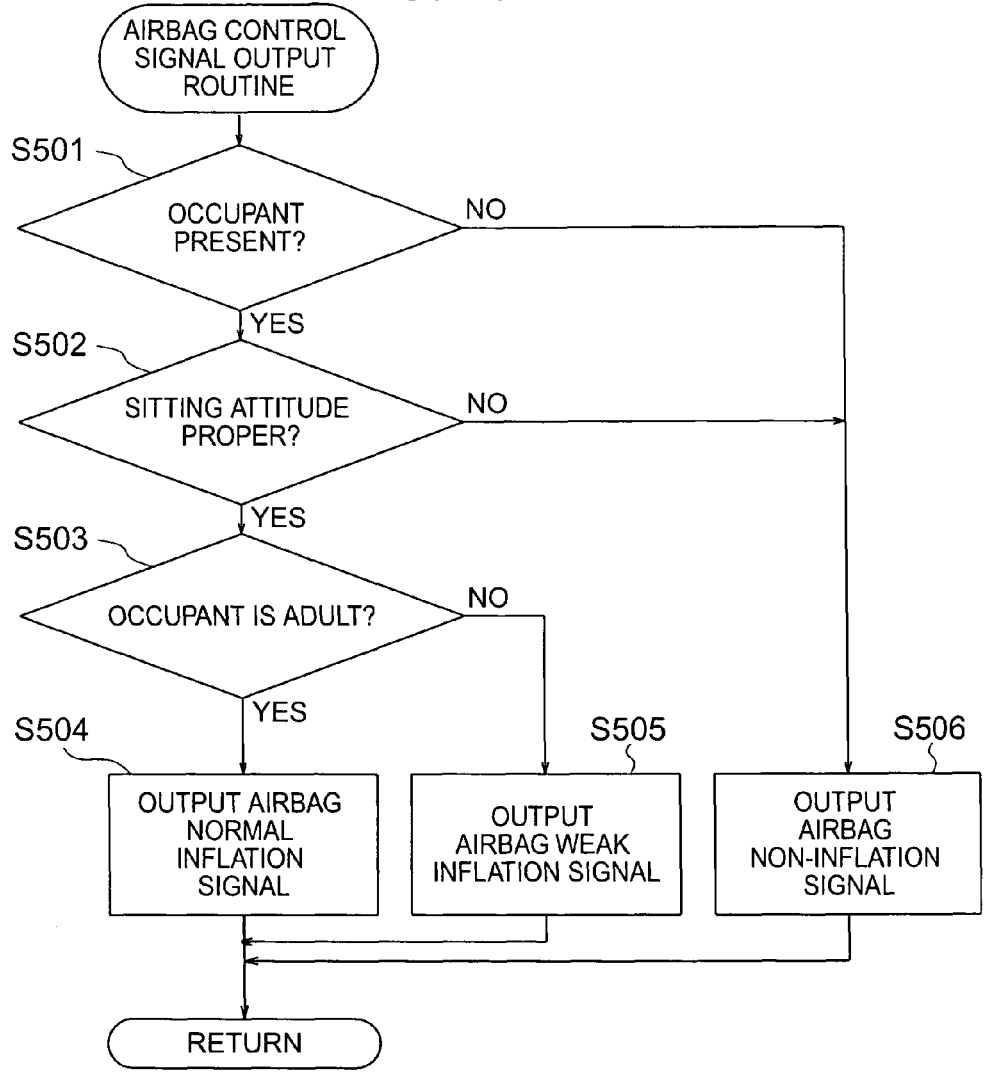
FIG. 11 is a flow chart showing part of the flow chart for detection of the vehicle interior condition in the embodiment of FIG. 1.

Next, on the basis of a result of the step S107 in FIG. 7, the system selects a suitable inflation intensity for the airbag at a step S108, as shown in FIG. 11.

The airbag control device 114 determines an airbag inflation method on the basis of a detection result issued from the control processor 112 and controls the airbag inflation. At steps S501 and S502, first, the system does not inflate the airbag when the airbag inflation is unnecessary, as when an occupant is absent, as when the occupant sits in the seat close to the airbag, as when the occupant sits with an unsuitable attitude, or as when a child seat is present (step S506). The system also determines whether or not the figure of the occupant is not larger than a predetermined level (the occupant being a child or a small stature woman) (step S503), and sets the airbag to be weakly inflated (step S505). Otherwise as when the figure of the occupant is not smaller than the predetermined level, the system sets the airbag to be normally inflated (step S504).

When a child seat is present, the detection of the head part based on the template matching is not carried out. Thus the system determines the absence of the occupant and sets the airbag not to be inflated.

As has been explained above, in accordance with the present embodiment, the position of the object present in the vehicle's seat can be identified, by illuminating the predetermined regions in the interior of the vehicle with light emitted from the plurality of illumination units 105 having different directivities, sequentially turning ON and OFF the light emission thereof in timing synchronized with the shutter of the imaging device 103, and detecting the quantity of reflected light of the light emitted from each illumination unit 105 through image processing. As a result, the condition of the occupant can be reliably detected and the suitable inflation of the airbag can be attained by the airbag control device 114.

Further, the illumination units 105 are located in at least either one of the predetermined left and right directions with respect to the occupant. Thus even when the occupant sits in the seat with his head part shifted in a left or right direction, the occupant can be reliably illuminated and therefore the occupant can be stably detected.

Preferably, the illumination unit 105 uses a predetermined wavelength range of infrared ray; and the imaging unit 104 is made up of the imaging device 103 sensitive to at least part of near-infrared ray and the band pass filter 102 for passing at least part of near-infrared ray therethrough on the optical path of the imaging device. With it, the influence of sunlight made incident from outside of the vehicle or visible light from the headlight of an oncoming vehicle or from outdoor lamps can be minimized. Since the infrared ray emitted from the illumination unit 105 passes through the band pass filter, reflected light of light emitted from the illumination unit 105 can be imaged by the imaging device 103.

Preferably, glass members including a windshield, side windows, rear side windows, and a rear window for a vehicle are made of a material having such a characteristic as to block most infrared rays. For this reason, most of sunlight incident from outside of the vehicle or most of infrared rays included in the headlight of the vehicle can be shielded.

Preferably, the imaging unit 104 and the illumination unit 105 are mounted at a level higher than the instrumental panel 204. Therefore, even when a large luggage is present in the forward side of the vehicle's seat or even when a luggage is present on the instrumental panel 204, the vehicle's seat can be photographed. Further, even when the occupant reads a newspaper while spreading out the paper, the occupant can be photographed from his upper side and thus the occupant can be detected.

Preferably, through the occupant position detection based on the quantity of reflected light of the illumination unit 105 and on the shading distribution and through the template matching of head part shape based on the normalization according to the occupant position, the occupant' position, attitude, and figure can be accurately detected at a high speed.

In the method for controlling the airbag inflation, preferably, the airbag is not inflated when the figure of the occupant is smaller than a predetermined level, when a child seat is present, when the occupant sits closer to the airbag inflation part, when the occupant sits in the seat with an incorrect attitude, when the occupant is absent, and when a luggage other than the occupant is placed on a vehicle's seat. When the figure of the occupant is not lower than the predetermined level and lower than a newly-provided predetermined level, the inflation intensity of the airbag is decreased. In the other use situations, the airbag is normally inflated. As a result, occupant's safety against the airbag inflation can be kept higher. Further, when it is unnecessary to inflate the airbag as when no occupant is present in the seat, the airbag is set not to be inflated, thus contributing to reduction in user's maintenance cost and also to resource saving.

Embodiment 2

Figure 13:
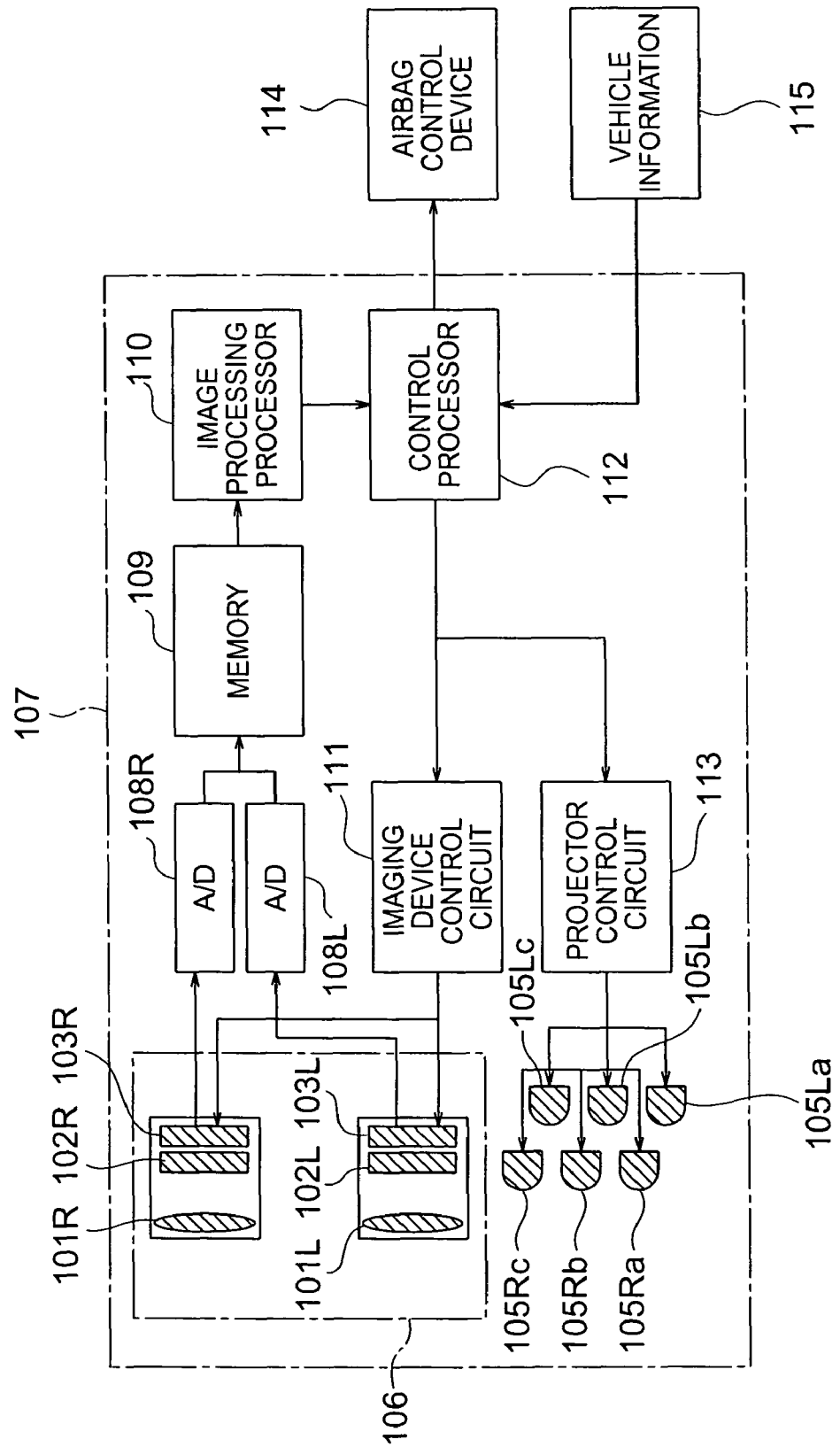
FIG. 13 shows an arrangement of a detection system of vehicle interior condition in accordance with another embodiment of the present invention.

FIG. 13 shows an arrangement of a detection system of vehicle interior condition in accordance with another embodiment of the present invention. We will explain about only different portions from the aforementioned embodiments. The other portions may be applied with the component part of the aforementioned embodiments.

The monocular camera has been used as the imaging unit in the embodiment 1. In the present embodiment, however, a stereo camera using two cameras is used as the imaging unit. Two of the imaging units similar in structure to the imaging unit used in the embodiment 1. More specifically, an imaging unit 106 in a detection system 116 of vehicle interior condition in accordance with the present embodiment includes lenses 101L, 101R, for condensing reflected light from photographing regions, band pass filters 102L, 102R for passing light in a predetermined infrared light wavelength range therethrough, and imaging devices 103L, 103R for converting reflected light from the photographing regions into electric signals respectively. Analog-digital converters 108L, 108R are connected to the imaging devices 103L, 103R to convert analog signals issued from the two imaging devices 103L, 103R into digital signals respectively.

In this connection, the devices and the units shown in FIG. 13 may be arbitrarily separated and located in the interior of a vehicle. For example, circuits, etc. except for the illumination unit 105 and the imaging unit 106 may be accommodated in a single casing as a control device (detection device of vehicle interior condition), and signal lines or the like may be wired between the illumination unit 105 and the imaging unit 106.

Figure 14:
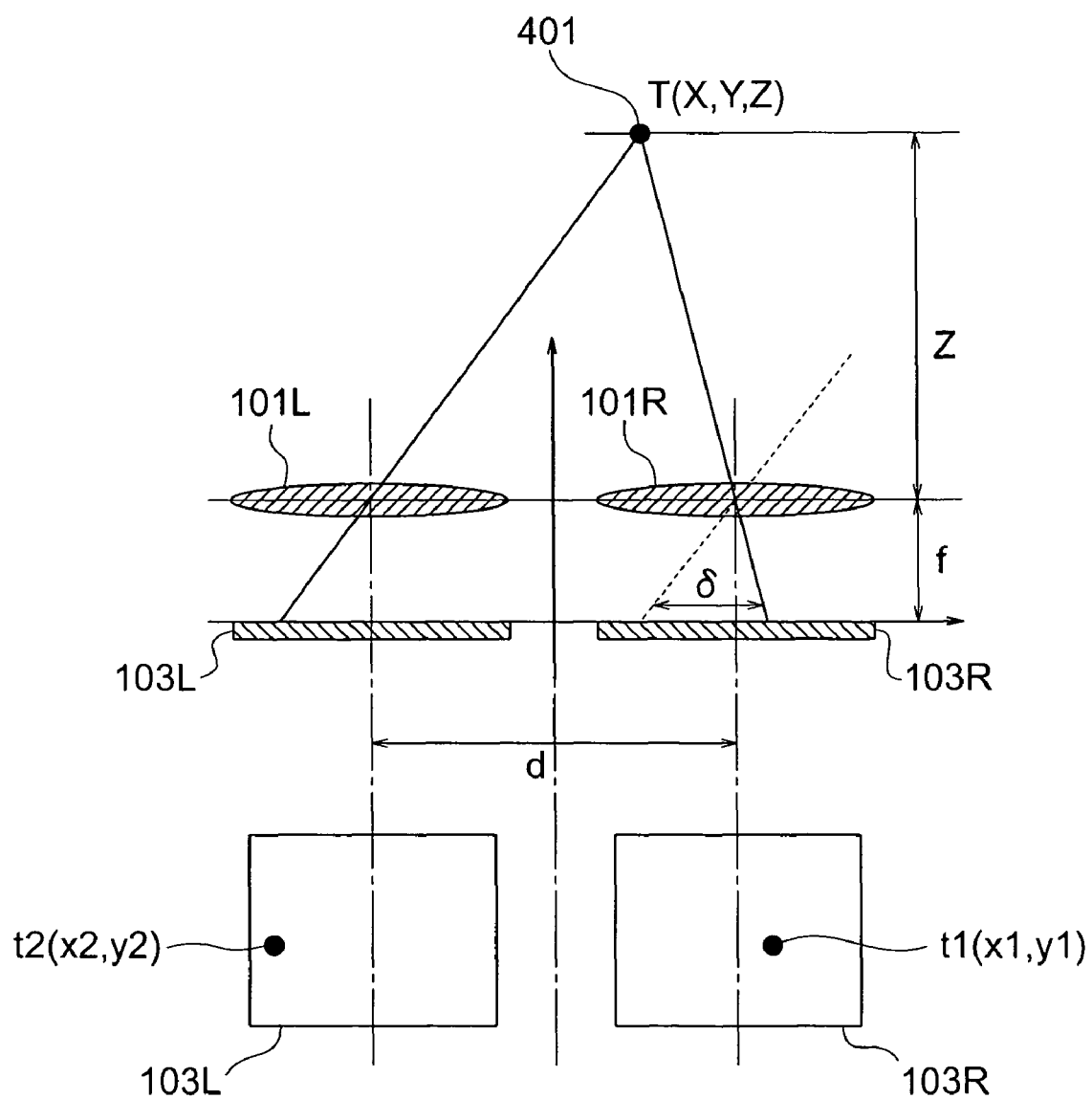
FIG. 14 shows a structure of a stereo camera in FIG. 13.

FIG. 14 shows an arrangement of the stereo camera in FIG. 13.

The two imaging devices 103L, 103R are positioned parallel to each other to be spaced by an interval d corresponding to a parallax d. The parallax d and the focal length f of the two lenses 101L, 101R are set to have such an accuracy as to be capable of recognizing an occupant's shape in an occupant presence range. When the focal length of the imaging device 103L(R) is set to be small and the photographing range is set to be wide, the occupant can be photographed even when a distance between the detection device of the present invention and the occupant as a measurement target is small.

Explanation will next be made as to how to generate a range image in the image processing processor 110. The system reads out a pair of left and right images from the memory 109. The left and right images are distorted by the wide angle lenses 101L(R). For this reason, such distortion is corrected by using a correction equation which is determined by the intrinsic values of the lenses. Assuming now that an image distorted by the wide angle lens 101L(R) has a coordinate (u, v), then the image after subjected to the distortion correction has a coordinate (x, y) which is given by an equation (1) as follows. In this equation, k denotes a parameter indicative of a modelization of the magnitude of a radial distortion.

$$\binom{x}{y} = \frac{2}{1 + \sqrt{1 - 4k(u^2 + v^2)}} \binom{u}{v} \quad (1)$$

The corrected left (or right) image and the corrected right (or left) image will be referred to as matching images, herein. A window of N×M pixels is prepared, a reference image is used as a template, the system scans the matching image for matching operation. In the present embodiment, a sequential similarity detection algorithm is used as the matching technique. In this algorithm, planes around a target pixel in an image are compared, a difference in point between left and right images with respect to a point in the planes is found, and one of points having smallest one of sums of such difference is set as a corresponding point. The system searches a processing target window I(I, j) for a concentration template image T(i, j) of n×M. A residue r is expressed by an equation (2) which follows.

$$r = \sum_{j=1}^{M} \sum_{i=1}^{N} |I(i, j) - T(i, j)| \quad (2)$$

In other words, the reference image is compared with the template image with respect to a plane (window) around a pixel therein, a difference in concentration value between points in the left and right images is found, and when the difference is small, the point is used as a corresponding point. In this case, the epipolar lines of the right and left images are substantially coincided with each other. Thus in order to find a corresponding point, it is only required to fix the vertical direction of the window to substantially the same height and to search for the corresponding point while shifting only the horizontal direction. In this case, since the two left and right objective lenses have a convergence angle of "0", the quantity of calculation can be further reduced by paying attention to the fact that all corresponding points in the right image as viewed from the left image is located more left side than those in the left image.

Through the above processing operations, coordinates satisfying conditions of the residue r not larger than a predetermined threshold become corresponding points of the left and right images.

As shown in FIG. 14, the center of the left lens 101L and the left imaging device 103L is positioned at an origin O in a three-dimensional coordinate system, and the right lens 101R and the right imaging device 103R are positioned at positions away by a distance d from the center of the left lens 101L. In FIG. 14, the right direction (a linear direction extended from the center of the left camera to the center of the right camera) denotes an X axis direction in the coordinate system, an upper direction denotes a Z axis direction, and a direction which is perpendicular to X and Z axes and extended toward you from the paper sheet denotes a Y axis direction.

Assume that light issued from a target object 401 having a coordinate T(X, Y, Z) is condensed by the left and right lenses 101L and 101R, and observed on a photographing planes (in the XY coordinate plane) of the left and right imaging devices 103L and 103R as points t2(x2, y2) and t1(x1, y1). Then points t1 and t2 become corresponding points. In this case, 3-dimensional coordinate points X, Y, and Z are expressed by triangulation as equations (3), (4), and (5), which follow.

$$X = \frac{x_1}{x_2 - x_1} d \quad (3)$$

$$Y = \frac{y_1}{x_2 - x_1} d \quad (4)$$

$$Z = \frac{f}{x_2 - x_1} d \quad (5)$$

In the equation (5), f denotes the focal length of each lens 101L(R).

The above calculating operations are carried out by the image processing processor 110 and stored in the memory 109 as a range image.

Further, the positional information obtained by the illumination unit 105 can also be used as a correction value for a distance measured result based on the stereo camera, thus increasing the accuracy of the occupant detection.

Figure 15:
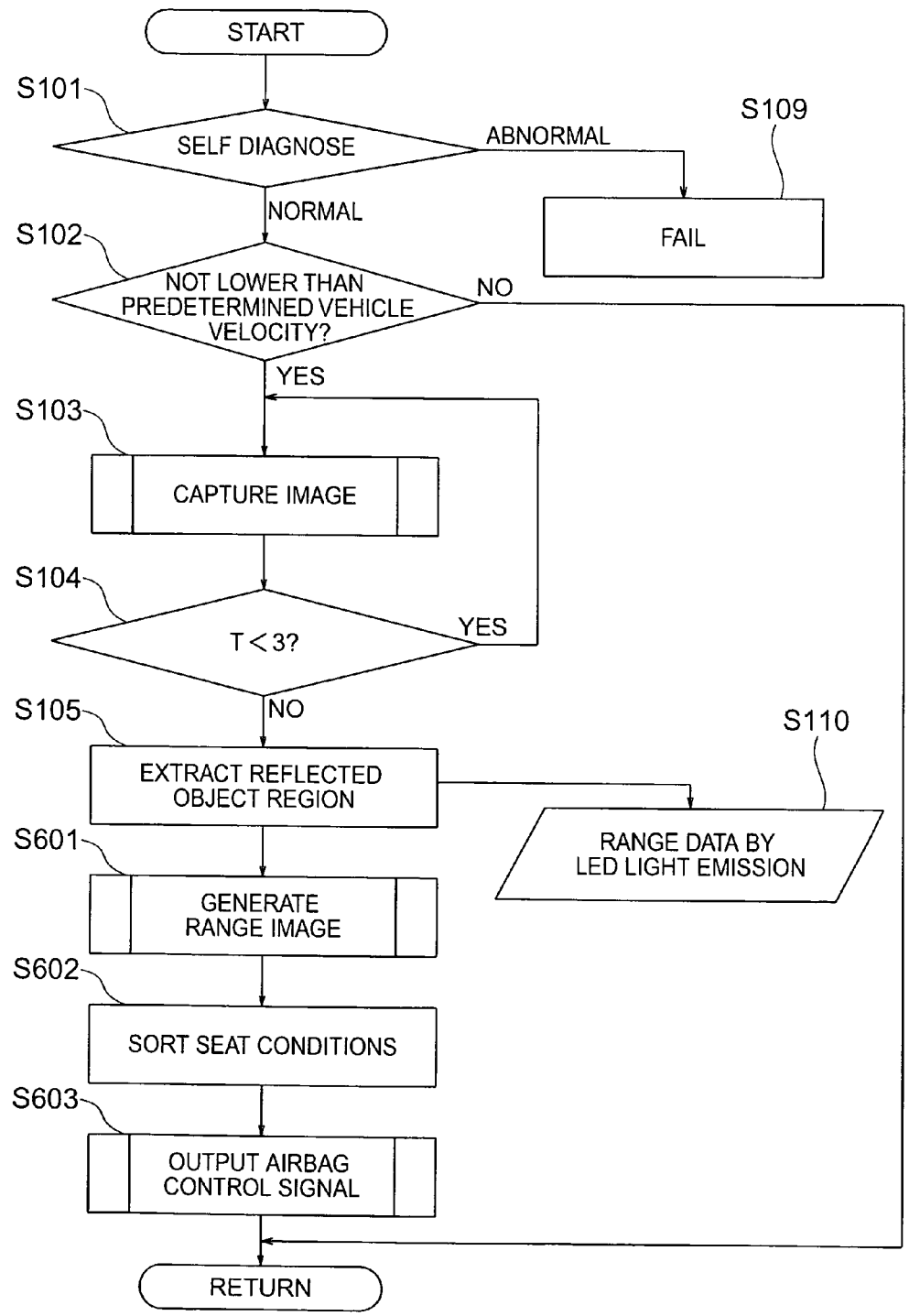
FIG. 15 is a flow chart for detection of a vehicle interior condition in the embodiment of FIG. 13.
Figure 16:
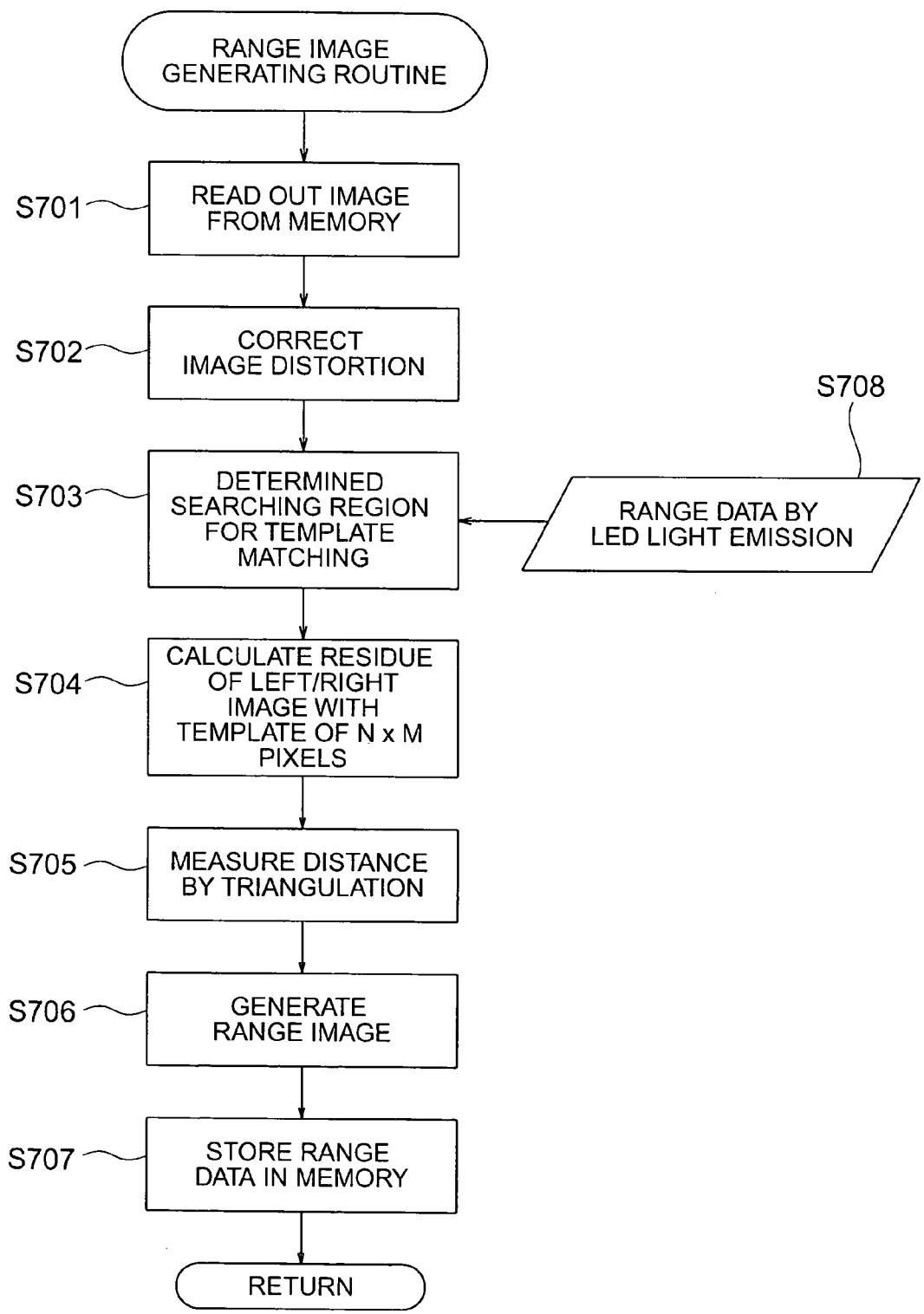
FIG. 16 is a flow chart showing part of the flow chart for detection of the vehicle interior condition in the embodiment of FIG. 13.
Figure 17:
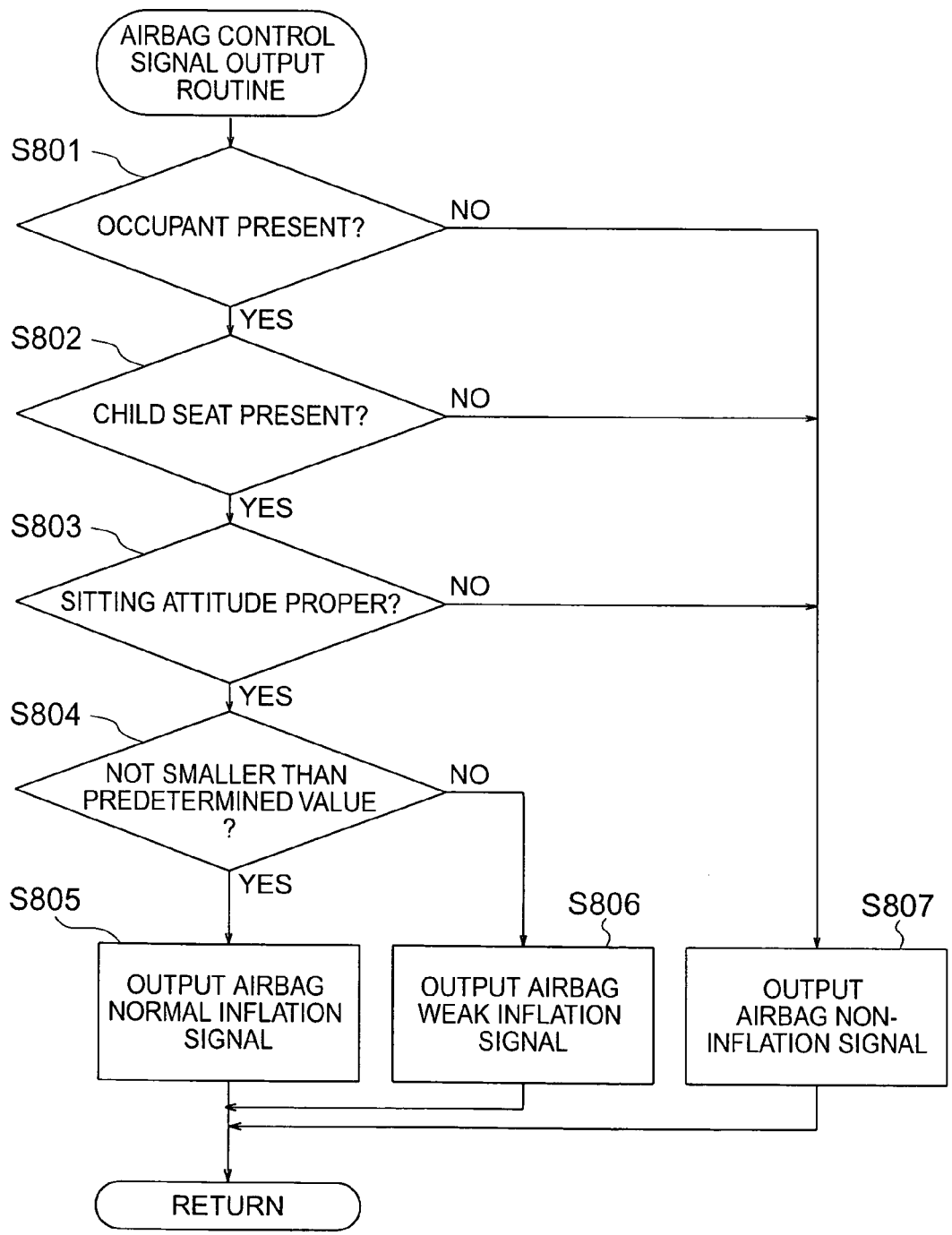
FIG. 17 is a flow chart showing part of the flow chart for detection of the vehicle interior condition in the embodiment of FIG. 13.

FIGS. 15 to 17 show flow charts for the vehicle interior condition detection in the embodiment of FIG. 13.

Steps S101 to S105, S109, and S110 are similar to those in the embodiment 1. At a step S601, a range image generating routine is executed, details of which are shown in FIG. 16. The system reads out the left and right images from the memory (step S701), and corrects the distortions of the images respectively (step S702). Subsequently, the system determines a searching region for the template matching from range data based on the step S110 (step S703), and perform residue calculation for the left and right images with use of the template of N×M (step S704). On the basis of a result of the template matching, the system performs distance measurement based on the triangulation (step S705), generates a range image (step S706), and then stores the range image in the memory (step S707).

Next, seat condition sorting operation is carried out in a step S602 in FIG. 15. This is attained by clustering with use of the range image to recognize the presence or absence of a vehicle's occupant, occupant's figure and attitude, and the presence or absence of a child seat. Learning data for clustering are previously stored in the memory 109. The learning data is a quantitative definition of such a pattern as the presence or absence of a vehicle's occupant, occupant's figure and attitude, and the presence or absence of a child seat; and the learning data is expressed in a feature space using parameters calculated from the range image.

The generated range image is divided, for example, into 5 range images (which divided range images will be referred to as division range images, hereinafter).

Figure 18:
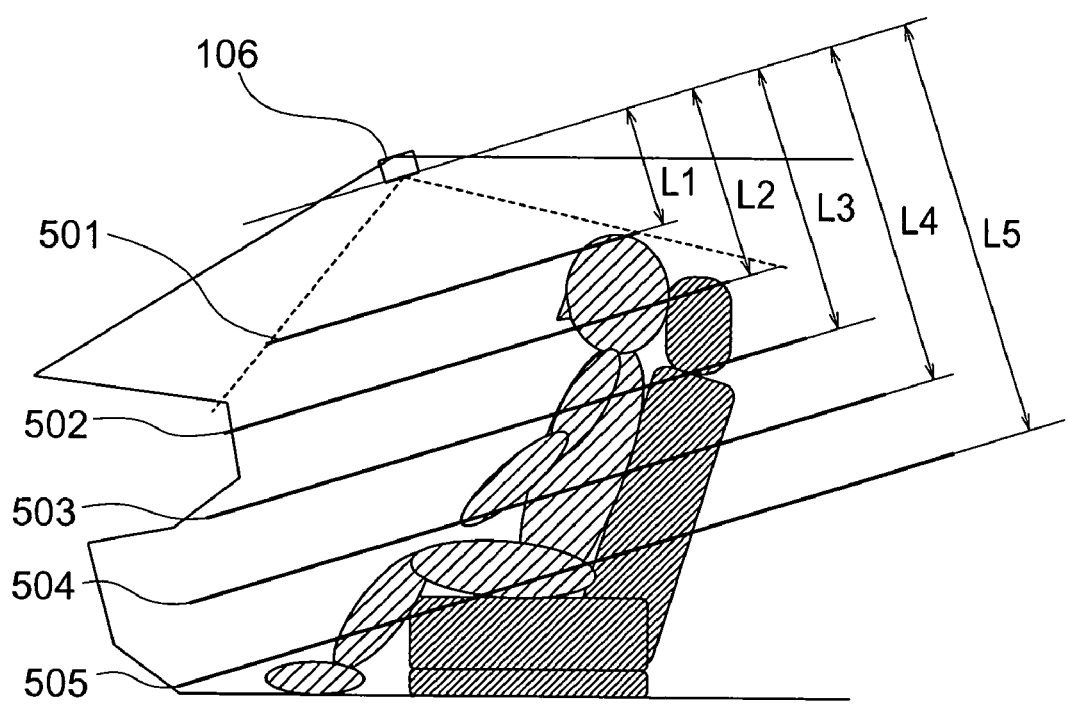
FIG. 18 shows how to divide an image in the embodiment of FIG. 13.

FIG. 18 shows how to divide an image in the embodiment of FIG. 13.

The range image is divided into a division distance image 501 having a distance L1 from the imaging device, a division distance image 502 having a distance L2 from the imaging device, a division distance image 503 having a distance L3 from the imaging device, a division distance image 504 having a distance L4 from the imaging device, and a division distance image 505 having a distance L5 from the imaging device. The division distance image at each distance is binarized based on a predetermined distance threshold.

Figure 19:
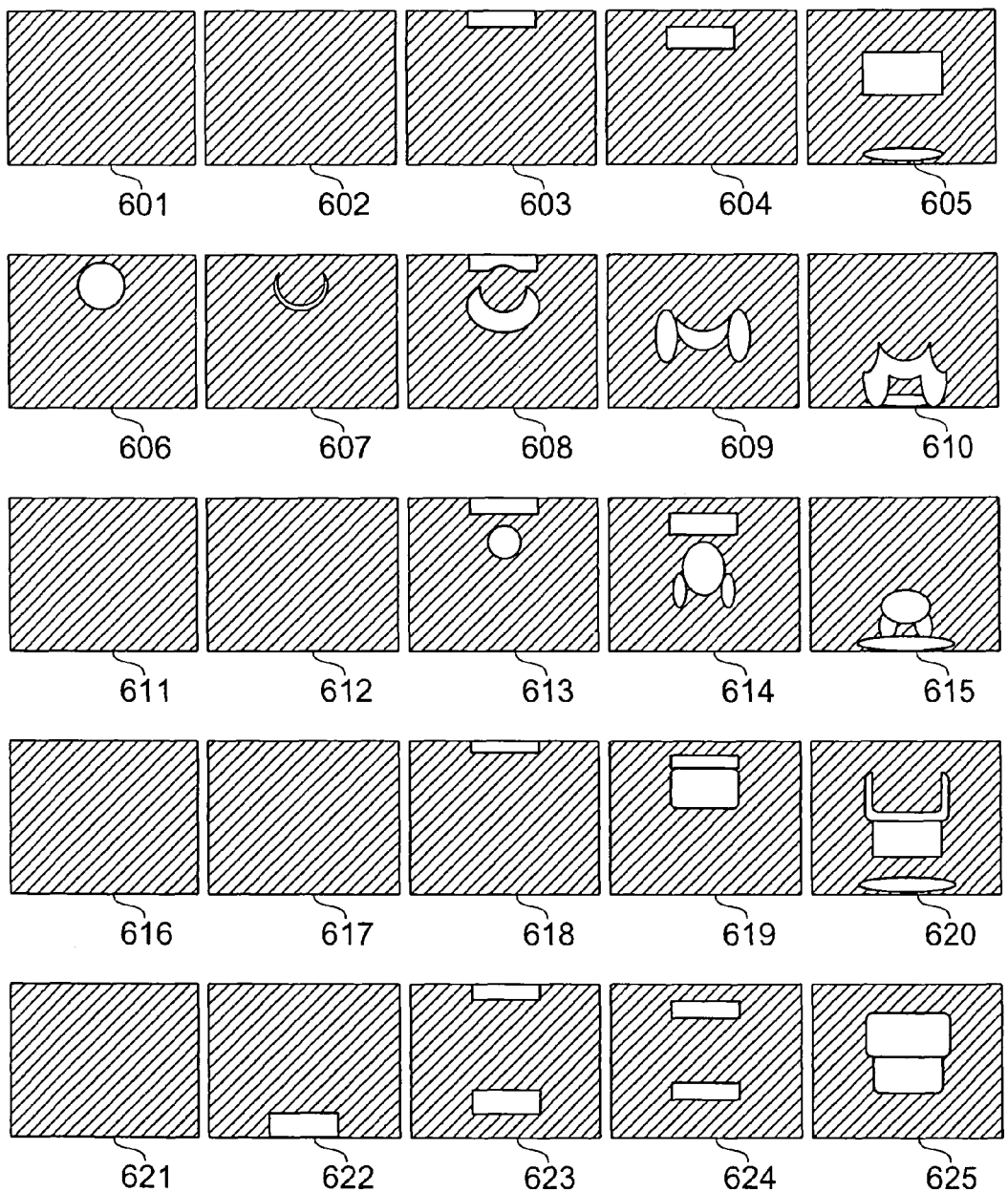
FIG. 19 shows an example of division distance images in the embodiment of FIG. 18.

FIG. 19 shows examples of the division distance images in the embodiment of FIG. 18.

Reference numerals 601 to 605 correspond to the division distance images 501 to 505 when no occupant is present. Numerals 611 to 615 correspond to the division distance images 501 to 505 when an adult occupant is present. Numerals 615 to 620 correspond to the division distance images 501 to 505 when a child occupant is present. Numeral 616 to 620 correspond to the division distance images 501 to 505 when a child seat is mounted so that the front side of the seat faces the front side of the vehicle, and numeral 621 to 625 correspond to the division distance images 501 to 505 when the back side of the child seat faces the back side of the vehicle, respectively.

On the basis of the binarized division distance images at the distances, surfaces Sn and gravity coordinates Gn(xgn, ygn) are clustered in the feature space. In this connection, symbol 'n' denotes the number of divisions. For example, the division distance image 501 has a surface S1 and a gravity coordinate G1(xg1, yg2).

Classes include the absence of an occupant in the seat, the presence of an occupant, and the presence of a child seat. The presence of an occupant is further classified into the occupant being an adult and the occupant being a child. Occupant's attitude is classified into the occupant in a normal attitude and the occupant in a danger attitude. In this connection, occupant's figure is defined as a sum of the surfaces Sn in each division distance image, and occupant's attitude is defined as a distribution of the gravity coordinates Gn in each division distance image. The learning data for such classification are previously stored as parameters before recognition.

Next, on the basis of a result of the step S602 in FIG. 15, an inflation intensity suitable for the airbag is selected at a step S603. Details of the step S603 are shown in FIG. 17.

The airbag control device 114 determines how to inflate the airbag to control the inflation of the airbag on the basis of a detection result issued from the control processor 112. At a step S801 in FIG. 17, the airbag control device determines the presence or absence of an occupant. In the absence of an occupant, the airbag control device sets the airbag not to be inflated (step S807). At a step S802, the airbag control device determines the presence or absence of a child seat. In the presence of a child seat, the airbag control device sets the airbag not to be inflated (step S807). At a next step S803, the airbag control device determines whether or not the occupant's sitting attitude is proper. When the occupant's sitting attitude is improper, the airbag control device sets the airbag not to be inflated (step S807). At a next step S804, the airbag control device determines the size of occupant's figure. When occupant's figure is not larger than a predetermined value, the airbag control device sets the airbag not to be inflated (step S806). When occupant's figure is not smaller than the predetermined value, the airbag control device sets the airbag to be normally inflated (step S805).

From the above consideration, the present embodiment uses the positional information obtained by the reflected light of the illumination unit 105 as a correction value for the distance result measured by the stereo camera to thereby reduce the quantity of calculation and increase a distance accuracy.

Since the use of the stereo camera enables acquisition of a detailed 3-dimensional shape, occupant's figure and attitude can be determined accurately.

Preferably, the unit for detecting the condition of a seat generates a range image from images obtained by the imaging unit 106 and detects the seat condition on the basis of a feature of a 3-dimensional shape obtained from the generated range image. The unit detects the absence of an occupant, the presence of an occupant, or the presence of a child seat. In the presence of an occupant, the unit determines occupant's figure and attitude by pattern-collating with previously-registered learning data. As a result, the presence or absence of an occupant, occupant's figure and attitude, and the presence of a child seat can be accurately detected.

Further, a distance from a target object can be detected from the range image. Thus even when the seat is moved in a forward or backward direction or even when the angle of a seat back is changed, the condition of the seat can be reliably detected.

Embodiment 3

Figure 20:
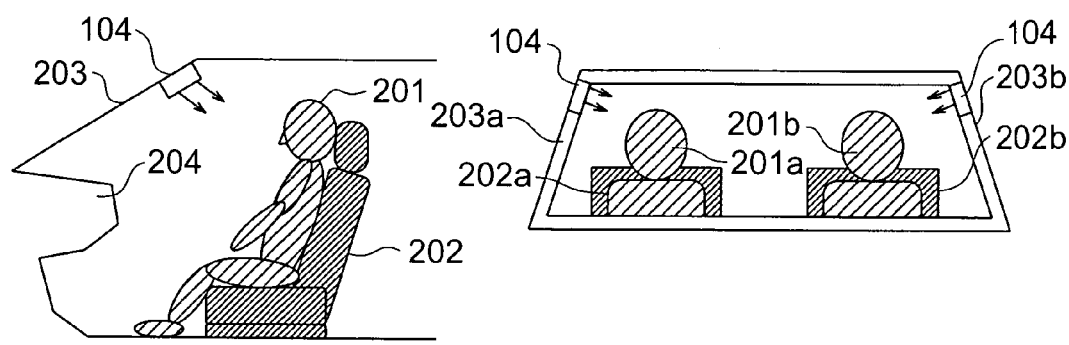
FIG. 20 is a diagram showing a deployment of imaging units in the detection device of vehicle interior condition in the other embodiment of the present invention.

FIG. 20 shows a deployment of the imaging units in the detection device of vehicle interior of the other embodiment of the present invention. We will explain about only different portions from the aforementioned embodiments. The other portions may be applied with the component part of the aforementioned embodiments.

In the embodiments 1 and 2, the imaging units 104 and 106 have been mounted on the vehicle's ceiling at the upper front side of the driver's seat 202a and the assistant driver's seat 202b so as to be capable of photographing the vicinities of headrests and seat backs of the driver's seat 202a and assistant driver's seat 202b, and the airbag device. Meanwhile, as shown in FIG. 20, when it is desired to detect the condition of the driver's seat, the imaging unit may be mounted on the upper part of an A pillar 203a on the side of the driver's seat, whereas, when it is desired to detect the condition of the assistant driver's seat, the imaging unit may be mounted on the upper part of an A pillar 203b on side of the assistant driver's seat. And photographing regions may be set similarly to the embodiments 1 and 2.

Since the imaging unit is mounted on the upper part of the A pillar, a vehicle's window can be avoided from entering the photographing regions, and the influence of external disturbance such as a scene outside the vehicle or sunlight can be minimized. Advantageously, further, wiring of the imaging unit for power supply and a space for mounting the imaging unit can be easily secured in the interior of the A pillar, thus preventing the degradation of its design. Even when the imaging unit is mounted in such a location as mentioned, the occupant detection result similar to in the embodiments 1 and 2 can be obtained.

Embodiment 4

Figure 21:
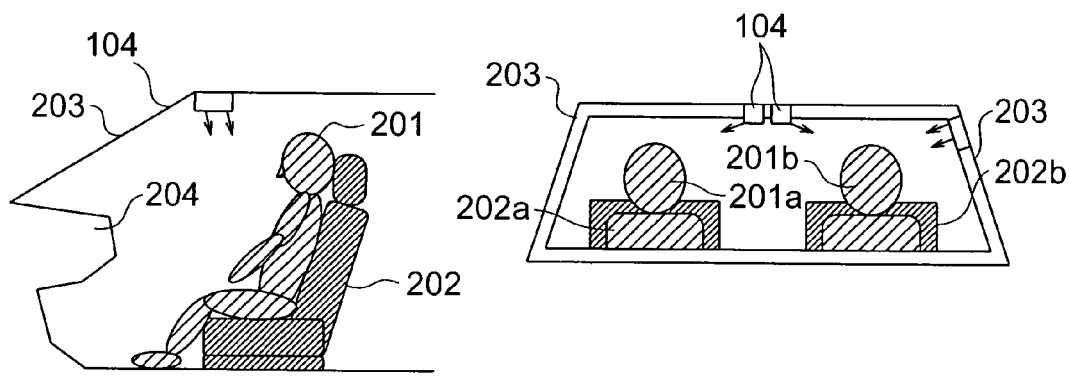
FIG. 21 is a diagram showing a deployment of imaging units in the detection device of vehicle interior condition in the other embodiment of the present invention.

FIG. 21 shows a deployment of the imaging units in the detection device of vehicle interior condition of the other embodiment of the present invention. We will explain about only different portions from the aforementioned embodiments. The other portions may be applied with the component part of the aforementioned embodiments.

As shown in FIG. 21, the imaging units may be mounted nearly at a midpoint (nearly at a rearview mirror) between the driver's seat and the assistant driver's seat respectively so as to have photographing regions similar to those in the embodiments 1 and 2.

Since the imaging units are mounted nearly at the rearview mirror, the detection devices of vehicle interior condition for the driver's seat and assistant driver's seat can be mounted to be concentrated on the single mounting location. Further, since wiring for power supply is present in the vicinity of the rearview mirror, the imaging units can be easily mounted.

Embodiment 5

Figure 22:
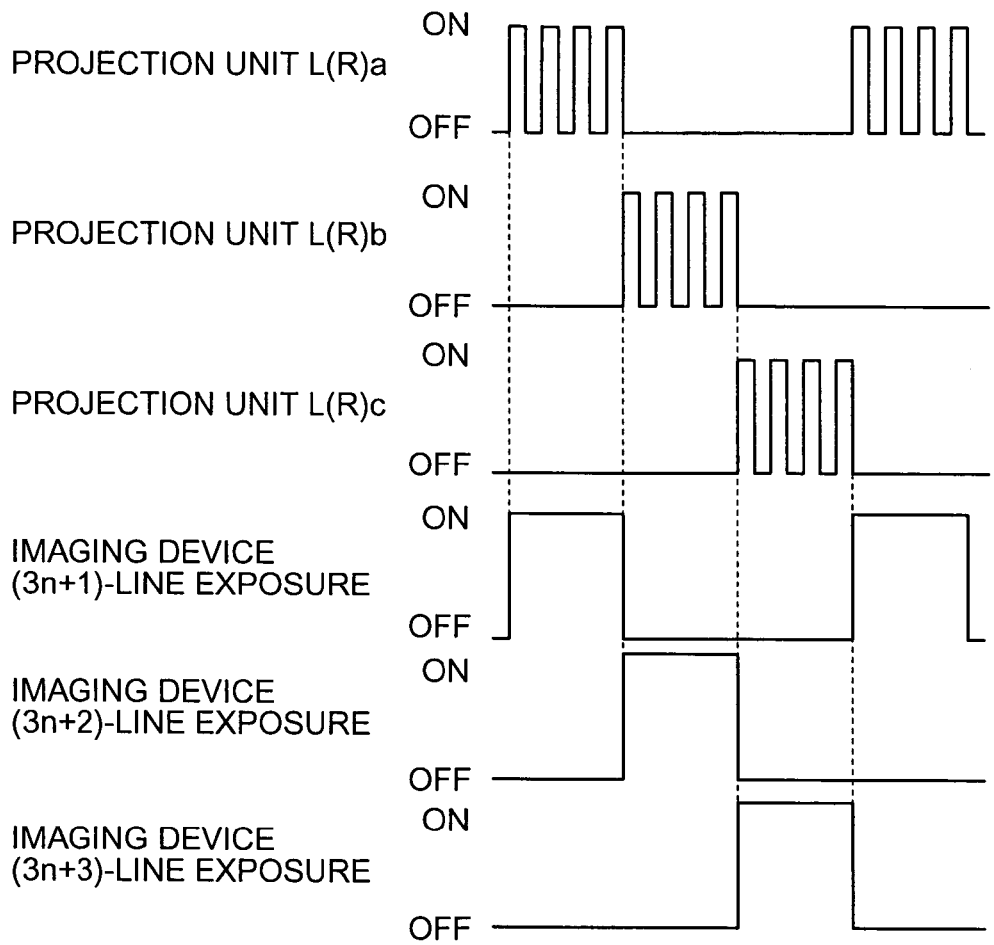
FIG. 22 is a timing chart for explaining the operation of the detection device of vehicle interior condition of the other embodiment of the present invention.

FIG. 22 shows a timing chart of signals appearing in the detection device of vehicle interior condition of the other embodiment of the present invention. We will explain about only different portions from the aforementioned embodiments. The other portions may be applied with the component part of the aforementioned embodiments.

In the embodiments 1 and 2, the exposure of the imaging device 103 is synchronized with the illumination unit 105 as shown in FIG. 4. All the pixels of the illumination device 105L(R)a are exposed for pulse light emission duration thereof, and the exposure is terminated at the same time as the end of the pulse light emission of the illumination device 105L(R)a, and the exposed pixel data is transmitted to the memory. The same holds true for the illumination device 105L(R)b and the illumination device 105L(R)c. That is, subsequently to the above operation, operations similar to the above are carried out.

The present embodiment, on the other hand, is featured in that, with respect to the light emission of the illumination device 105L(R)a to 105L(R)c, ones of the pixels of the imaging device 103 corresponding to a predetermined number of horizontal or vertical lines are exposed, as shown in FIG. 12.

More specifically, upon pulse light emission of the illumination device 105L(R)a, ones of the pixels of the imaging device 103 corresponding to (3n+1) horizontal or vertical lines are exposed. Subsequently, upon pulse light emission of the illumination device 105L(R)b, ones of the pixels of the imaging device 103 corresponding to (3n+2) horizontal or vertical lines are exposed, and subsequently, upon pulse light emission of the illumination device 105L(R)c, ones of the pixels of the imaging device 103 corresponding to (3n+3) horizontal or vertical lines are exposed. In this example, 'n' is an integer value which starts with 0 and satisfies a relation, (3n+3)≦(the number of horizontal or vertical pixels in the imaging device 103).

In the present embodiment, an image capturing period can be made faster by an amount corresponding to a reduction in the quantity of information caused by the image thinning, and consequently a processing period for the occupant detection can be made higher.

Although explanation has been made in connection with the case where the 6 illumination units 105 (3 pairs of the left and right illumination units) are mounted in the present embodiment, an arbitrary number of the illumination units 105 may be employed to achieve the corresponding thinning exposure.

Embodiment 6

Figure 23:
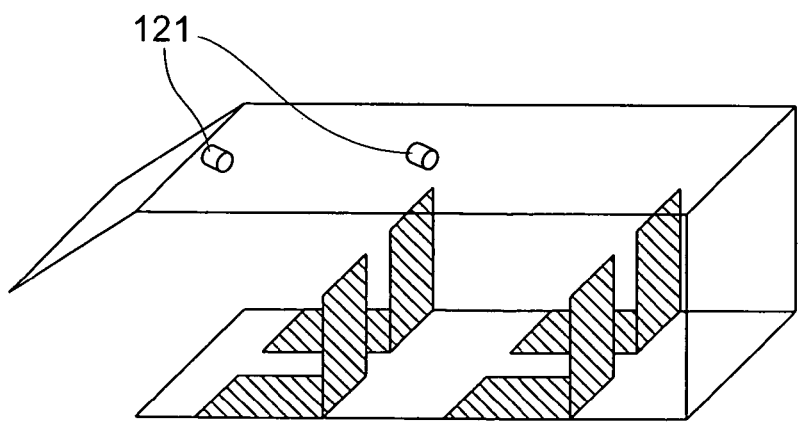
FIG. 23 shows a deployment of the imaging units in the detection device of vehicle interior condition of the other embodiment of the present invention.
Figure 24:
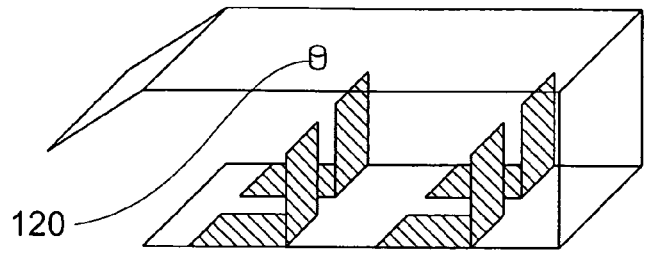
FIG. 24 shows a deployment of the imaging units in the detection device of vehicle interior condition of the other embodiment of the present invention.

FIGS. 23 and 24 show deployments of the imaging units in the detection device of vehicle interior condition of the other embodiment of the present invention. We will explain about only different portions from the aforementioned embodiments. The other portions may be applied with the component part of the aforementioned embodiments.

In the embodiment 1, the monocular camera imaging unit 104 has been used as the imaging unit. In the present embodiment, however, imaging units 121 of a wide angle lens type are deployed as shown in FIG. 23. Since the use of the wide angle lens causes distortion in its image, the distortion of the image is corrected and then used for the occupant detection.

The use of the wide-angle imaging unit 121 enables the occupant detection in the front seats (driver's seat and assistant driver's seat) to be attained with a single imaging unit. Even for back seats, the occupant detection can be similarly attained with use of a single imaging unit.

As shown in FIG. 24, further, an omnidirectional imaging unit 120 including a lens which has an omnidirectional photographing range, may be used in place of the wide-angle imaging unit 121. Even an image obtained by the omnidirectional imaging unit is distorted. Thus such an image is corrected with respect to the distortion and then used for the occupant detection. When the omnidirectional imaging unit 120 is employed, the front seats and the rear seats can be photographed with use of a single imaging unit.

Embodiment 7

Figure 25:
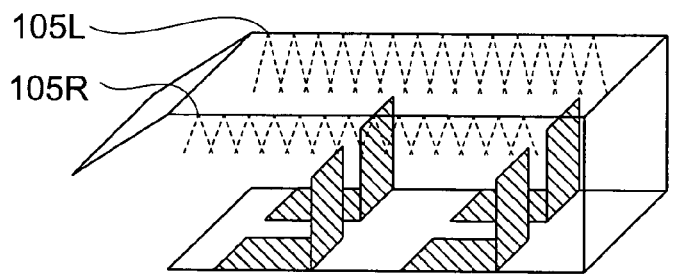
FIG. 25 shows a deployment of illuminators in the detection device of vehicle interior condition of the other embodiment of the present invention.
Figure 26:
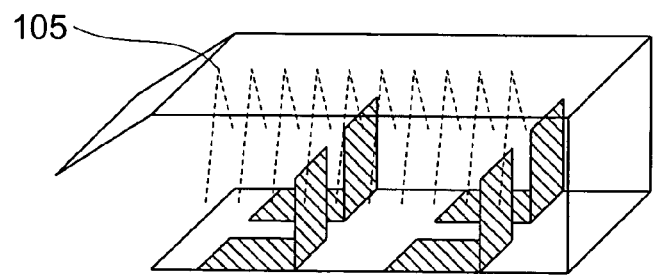
FIG. 26 shows a deployment of the illuminators in the detection device of vehicle interior condition of the other embodiment of the present invention.
Figure 27:
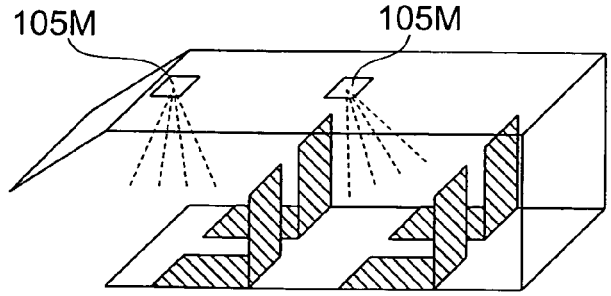
FIG. 27 shows a deployment of the illuminators in the detection device of vehicle interior condition of the other embodiment of the present invention.

FIGS. 25, 26, and 27 shows deployments of the illumination units in the detection device of vehicle interior condition in the other embodiment of the present invention. We will explain about only different portions from the aforementioned embodiments. The other portions may be applied with the component part of the aforementioned embodiments.

In the embodiments 1 and 2, the illumination region of the illumination unit 105 has been set for the vicinity of the front seats has been used.

In the present embodiment, the illumination devices 105L and 105R are mounted on the ceiling of a vehicle along left and right lines extended from the front seats to the rear seats, as shown in FIG. 25. With such a deployment, even an occupant sitting on the rear seat can be illuminated. As a result, effects similar to the occupant detection of the front seats in the embodiments 1 and 2 can be achieved.

As shown in FIG. 26, further, the illumination units 105 may be mounted on the vehicle ceiling along lines extended from the center of the ceiling to forward and backward directions.

As shown in FIG. 27, such illumination units 105M as mentioned above may be built in map lamps provided in the vehicle interior. Since the imaging units are built in the map lamps, the system is increased in the power availability, mountability, and maintenance.

Embodiment 8

Figure 28:
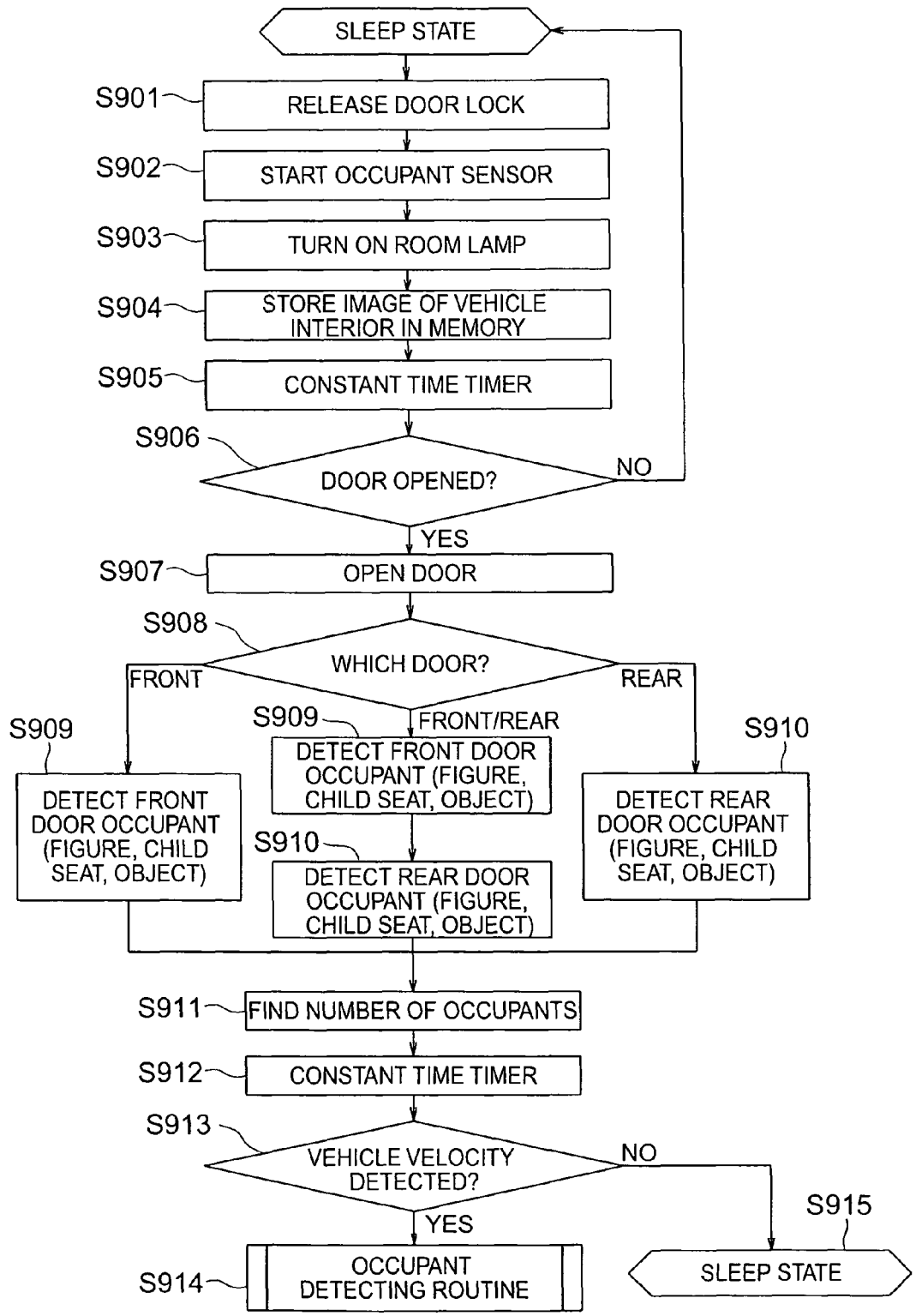
FIG. 28 is a flow chart for explaining the operation of the detection device of vehicle interior condition in the other embodiment of the present invention.

FIG. 28 is a flow chart for explaining the operation of the detection device of vehicle interior condition of the other embodiment of the present invention. We will explain about only different portions from the aforementioned embodiments. The other portions may be applied with the component part of the aforementioned embodiments.

When a vehicle is put in its stopped state, an occupant detection sensor is placed in a sleep state. When an occupant or driver releases the door lock of the vehicle in a keyless entry system or the like (step S901), the occupant detection sensor detects a signal issued in response to the door lock release and is started (step S902).

Next, the system turns OFF room lamps such as map lamps or turns ON the illumination units 105 (step S903). Further, the system photographs the interior of the vehicle at this time point and stores the photographed data in the memory (step S904).

When a door is not opened in a predetermined time duration (step S905), the system is put again in the sleep state (step S901) to suppress power consumption (step S906). When the door is opened, the system determines one of doors which was opened at a step S908. When a front door was opened, front occupant detection (step S909) is executed. When a rear door was opened, rear occupant detection (step S910) is executed. When the front and rear doors were opened, front/rear both occupant detection is executed.

On the basis of such processing results, the number of occupants (step S911) is identified and the positions of occupants' seats are identified (not shown in the drawing). Further, when the system fails to detect a vehicle velocity in a predetermined time duration (step S912), the system is put again in the sleep state to suppress power consumption (step S915). When detecting a vehicle velocity, the system transits to an occupant detection routine to detect the occupant at intervals of a predetermined time (step S914).

The present embodiment can detect an occupant in the nighttime only with use of such a room lamp as an existing map lamp. In addition, the embodiment can accurately detect the presence or absence of an occupant and occupant's figure by photographing the interior of the vehicle before the occupant rides in the vehicle, storing the photographed image in the memory, and comparing the photographed image with an image photographed after the occupant rides in the vehicle.

The present invention is not restricted to the aforementioned embodiments but may be modified in various ways without departing from the subject matter of the present invention.

The number of the illumination units 105 is 6 in total when 3 of the illumination units 105 are mounted along each of the left and right lines in the foregoing embodiments. However, the number of the illumination units may be set at an arbitrary value. Further, when the quantity of light from the illumination unit is great, the illumination of such an illumination unit may be directed only from the left or right side when viewed from the vehicle proceeding direction.

The CCD element has been used as the imaging device 103 in the foregoing embodiments. However, the CCD element may be replaced with a CMOS element. In other words, any type of imaging device may be employed, so long as the imaging device can be sensitive to a wavelength range of infrared light emitted from the illumination unit 105.

The vehicle velocity has been used as the vehicle information in the foregoing embodiments. In addition to the vehicle velocity, however, information from various types of sensors mounted in the vehicle including information from a sensor for detecting the mounted condition of a seat belt, information on the front or rear position of a vehicle's seat, information on the reclining angle of a seat back, and information on a pressure or weight sensor mounted in the vehicle's seat may be used as the vehicle information.

Although the airbag has been used as the control target in the foregoing embodiments, the tension of a seat belt may also be used as the control target. For example, when the figure is not larger than a predetermined value (as when the figure is child's figure), such control as to weaken the tension of the seat belt or to strengthen the tension of a child seat may be possible. Further, such control may be employed even for a traction control device. When the occupant takes an improper attitude, abrupt acceleration becomes dangerous to the occupant. To avoid this, safe traction control can be achieved according to the occupant's attitude.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A system for detecting vehicle interior condition comprising:
   an illumination unit which includes a plurality of individual illumination devices that are positioned and directed to illuminate, respectively, a plurality of mutually different illumination regions, which illumination regions collectively include at least one seat of a vehicle and a surrounding region thereof, said illumination devices being operable to illuminate their respective illumination regions sequentially at predetermined different timings during a predetermined period;
   an imaging unit positioned and directed so as to photograph an occupant or object on said seat in synchronism with each of said different timings of said illumination devices; and
   a control unit which is coupled to control illumination of said illumination devices, and has an image comparator for comparing a plurality of images photographed by said imaging unit, as well as an information generator for generating information indicative of a condition of said occupant or object on the basis of a comparison result of said image comparator.

2. The system according to claim 1, wherein said illumination unit is arranged so as to illuminate the seat of the vehicle from an upper side.

3. The system according to claim 1, wherein:
   said plurality of illumination devices, are mounted on a ceiling of the vehicle in rows at both sides thereof above at least one of a driver's seat and an assistant driver's seat of the vehicle; and
   illumination angles of the illumination devices are directed so that the illumination devices illuminate at least one of the driver's seat and an assistant driver's seat.

4. The system according to claim 3, wherein said rows of illumination devices are disposed parallel to a direction of movement of said vehicle.

5. The system according to claim 3, wherein said illumination devices arc mounted on the ceiling of the vehicle at upper forward parts of at least one of the driver's seat and the assistant driver's seat to photograph any one of at least a headrest, a seat back, and an airbag unit of said at least one of the driver's seat and the assistant driver's seat.

6. The system according to claim 1, wherein said imaging unit photographs an occupant or object in front and rear seats.

7. A device for detecting vehicle interior condition, comprising:
   an illumination unit which includes a plurality of individual illumination devices that are positioned and directed to illuminate, respectively, a plurality of mutually different illumination regions, which illumination regions collectively include at least one seat of a vehicle and a surrounding region thereof, said illumination devices being operable to illuminate their respective illumination regions sequentially at predetermined different timings during a predetermined period;
   an input unit for receiving a signal from an imaging unit which photographs an occupant or object on said seat in synchronism with each of said different timings of said illumination devices;
   an image comparator for comparing a plurality of images photographed by said imaging unit;
   an information generator for generating information indicative of a condition of said occupant or object on the basis of a comparison result of said image comparator; and
   an output unit for issuing the information generated by said information generator.

8. A method for detecting vehicle interior condition, comprising:
   sequentially illuminating a plurality of mutually different illumination regions, which illumination regions collectively include at least one seat of a vehicle and/or a surrounding region thereof, said illumination regions being illuminated at predetermined different timings during a predetermined period;
   photographing an occupant or object on said seat in synchronism with each illumination of a respective different one of said illumination regions;
   comparing a plurality of said photographed images; and
   generating information indicative of a condition of said occupant or object on the basis of a comparison result of said comparison step.

* * * * *